United States Patent
K et al.

(10) Patent No.: US 11,115,328 B2
(45) Date of Patent: Sep. 7, 2021

(54) EFFICIENT TROUBLESHOOTING IN OPENFLOW SWITCHES

(71) Applicant: Telefonaktiebolaget LM Ericsson (publ), Stockholm (SE)

(72) Inventors: Faseela K, Bengaluru (IN); Ashutosh Bisht, Bangalore (IN); Vyshakh Krishnan C H, Bangalore (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/607,319

(22) PCT Filed: May 4, 2017

(86) PCT No.: PCT/IB2017/052581
§ 371 (c)(1),
(2) Date: Oct. 22, 2019

(87) PCT Pub. No.: WO2018/203108
PCT Pub. Date: Nov. 8, 2018

(65) Prior Publication Data
US 2020/0382421 A1    Dec. 3, 2020

(51) Int. Cl.
*G06F 15/173* (2006.01)
*H04L 12/715* (2013.01)
(Continued)

(52) U.S. Cl.
CPC .......... *H04L 45/64* (2013.01); *H04L 12/4645* (2013.01); *H04L 43/026* (2013.01); *H04L 69/22* (2013.01)

(58) Field of Classification Search
CPC ..... H04L 45/64; H04L 12/4645; H04L 69/22; H04L 43/026
(Continued)

(56) References Cited

U.S. PATENT DOCUMENTS 8,561,025 B1    10/2013  Bisht et al.
2001/0037465 A1 *  11/2001  Hart, III ............. H04N 21/2225
726/28
(Continued)

FOREIGN PATENT DOCUMENTS

WO    2017/118875 A1    7/2017
WO    2018/046988 A1    3/2018
(Continued)

OTHER PUBLICATIONS

Open Networking Foundation, "OpenFlow Switch Specification," V 1.5.0 (protocol version 0x06), ONF TS-020, Dec. 19, 2014, pp. 1-277.
(Continued)

*Primary Examiner* — Thuong Nguyen
(74) *Attorney, Agent, or Firm* — Nicholson, De Vos, Webster & Elliott, LLP

(57) ABSTRACT

A method implemented by a switch in a Software Defined Networking (SDN) network to trace packets in the SDN network, where the switch includes a packet processing pipeline. The method includes receiving a first packet, determining, at a first flow table of the packet processing pipeline, whether the first packet is to be traced, punting a copy of the first packet to an SDN controller and directing the first packet to a second flow table of the packet processing pipeline in response to a determination at the first flow table that the first packet is to be traced.

18 Claims, 11 Drawing Sheets

(51) Int. Cl.
 *H04L 12/46* (2006.01)
 *H04L 12/26* (2006.01)
 *H04L 29/06* (2006.01)

(58) Field of Classification Search
 USPC ........ 709/223, 224, 238, 226; 370/235, 230, 370/392, 254, 248, 474, 389
 See application file for complete search history.

(56) References Cited

U.S. PATENT DOCUMENTS

| | | | |
|---|---|---|---|
| 2004/0049596 A1* | 3/2004 | Schuehler | H04L 69/16 709/238 |
| 2006/0022818 A1* | 2/2006 | Piltonen | G08B 21/22 340/539.13 |
| 2008/0126877 A1* | 5/2008 | Alsup | G06F 11/3636 714/45 |
| 2009/0254468 A1* | 10/2009 | Acedo | H04L 67/16 705/35 |
| 2009/0292994 A1* | 11/2009 | Lwo | G06F 9/543 715/733 |
| 2010/0005151 A1* | 1/2010 | Gokhale | G06F 16/27 709/216 |
| 2011/0125892 A1 | 5/2011 | Rajan et al. | |
| 2013/0176888 A1 | 7/2013 | Kubota et al. | |
| 2013/0290639 A1 | 10/2013 | Tran et al. | |
| 2013/0304915 A1* | 11/2013 | Kawai | H04L 41/5019 709/224 |
| 2014/0241356 A1* | 8/2014 | Zhang | H04L 45/54 370/392 |
| 2014/0286342 A1* | 9/2014 | Xia | H04L 45/38 370/392 |
| 2014/0301213 A1 | 10/2014 | Khanal et al. | |
| 2015/0088823 A1* | 3/2015 | Chen | G06F 16/273 707/626 |
| 2015/0127805 A1* | 5/2015 | Htay | H04L 47/70 709/224 |
| 2015/0139238 A1* | 5/2015 | Pourzandi | H04L 45/64 370/392 |
| 2015/0172189 A1* | 6/2015 | Pitchai | H04L 69/22 370/392 |
| 2015/0256397 A1* | 9/2015 | Agarwal | H04L 49/25 370/254 |
| 2015/0281036 A1* | 10/2015 | Sun | H04L 41/14 370/248 |
| 2015/0334045 A1* | 11/2015 | Tremblay | H04L 45/14 709/226 |
| 2016/0050131 A1 | 2/2016 | Zhang et al. | |
| 2016/0105267 A1* | 4/2016 | Verplanken | H04L 69/22 370/474 |
| 2016/0112328 A1 | 4/2016 | Anand | |
| 2016/0142291 A1* | 5/2016 | Pollan | H04L 45/745 370/392 |
| 2016/0142301 A1 | 5/2016 | Anand | |
| 2016/0226578 A1* | 8/2016 | Yuan | H04J 3/0602 |
| 2016/0227598 A1* | 8/2016 | Singh | H04W 76/18 |
| 2016/0234068 A1* | 8/2016 | Dolganow | H04L 47/2483 |
| 2016/0274976 A1* | 9/2016 | Manjunath | G06F 11/1451 |
| 2016/0301601 A1* | 10/2016 | Anand | H04L 69/22 |
| 2017/0019152 A1* | 1/2017 | Kim | H04B 1/16 |
| 2017/0068684 A1* | 3/2017 | Hahn | G06F 16/1734 |
| 2017/0155574 A1 | 6/2017 | Mullin et al. | |
| 2018/0063072 A1* | 3/2018 | Wackerly | H04L 29/06102 |
| 2018/0115466 A1* | 4/2018 | Kazemian | H04L 45/124 |
| 2018/0287932 A1* | 10/2018 | Viquez Calderon | H04L 45/745 |
| 2019/0229977 A1* | 7/2019 | Bisht | H04L 47/2483 |

FOREIGN PATENT DOCUMENTS

| | | |
|---|---|---|
| WO | 2019/043435 A1 | 3/2019 |
| WO | 2019/239190 A1 | 12/2019 |

OTHER PUBLICATIONS

Handigol, et al., "Where is the Debugger for my Software Defined Network?," ACM, HotSDN'12, Aug. 13, 2012, Helsinki, Finland, 6 pages.
Zhi, et al., "MED: The Monitor-Emulator-Debugger for Software-Defined Networks", IEEE INFOCOM 2016—The 35th Annual IEEE International Conference on Computer Communications, IEEE, Apr. 10, 2016, 9 pages.
Eichelberger, et al., "SFC Path Tracer: A Troubleshooting Tool for Service Function Chaining", IFIP/IEEE International Symposium on Integrated Network Management (IM2017), 2017, pp. 568-571.
Kawai, et al., "Per-Flow Entry Verification for Legacy SDN", The 22nd Asia-Pacific Conference on Communications (APCC2016), IEEE, Aug. 2016, pp. 502-510.

* cited by examiner

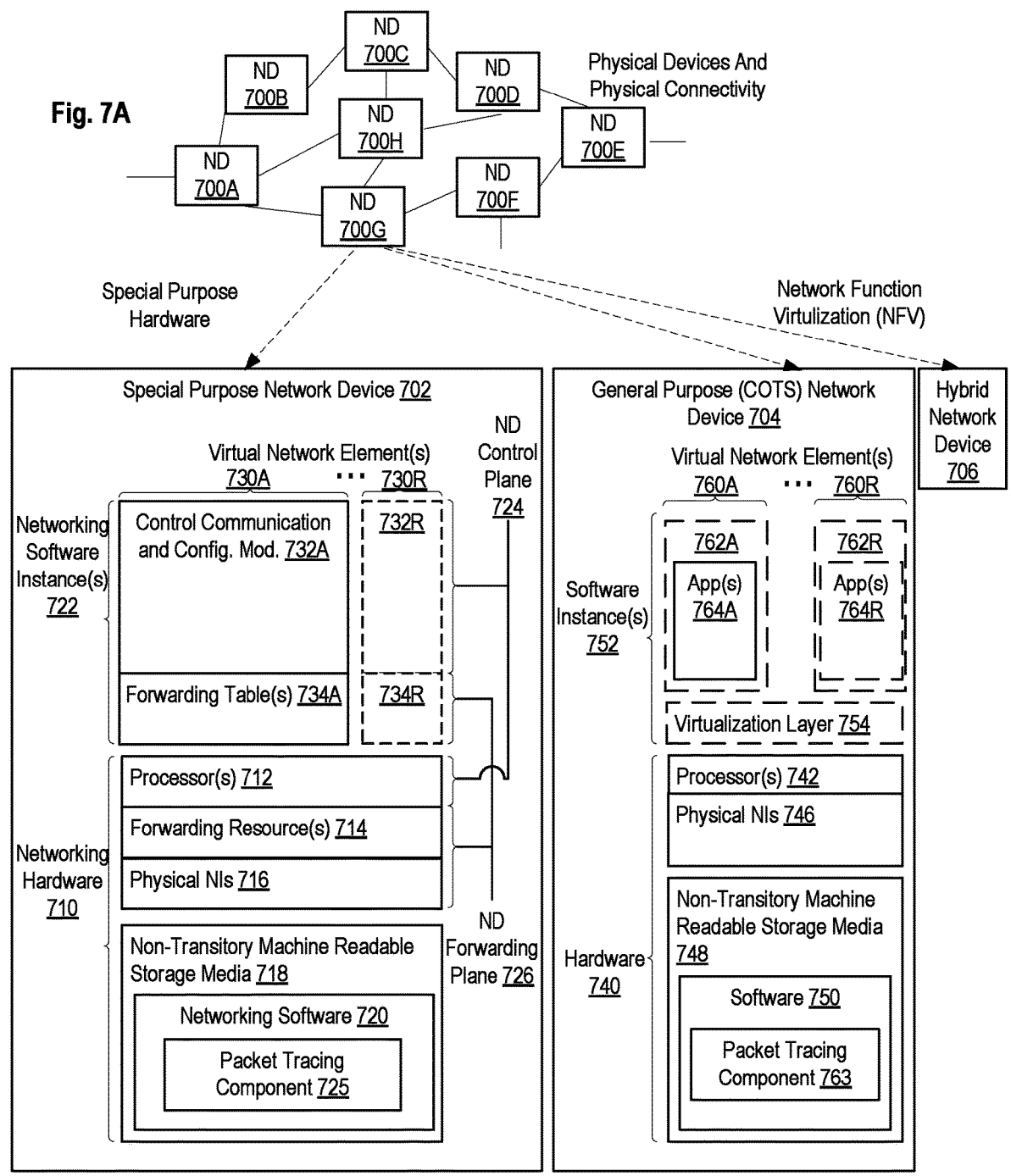

EFFICIENT TROUBLESHOOTING IN OPENFLOW SWITCHES

CROSS-REFERENCE TO RELATED APPLICATIONS

This application is a national stage of International Application No. PCT/IB2017/052581, filed May 4, 2017, which is hereby incorporated by reference.

TECHNICAL FIELD

Embodiments of the invention relate to the field of Software Defined Networking (SDN), and more specifically, to tracing packets in an SDN network.

BACKGROUND

Software Defined Networking (SDN) is an approach to computer networking that employs a split architecture network in which the forwarding (data) plane is decoupled from the control plane. The use of a split architecture network simplifies the network devices (e.g., switches) implementing the forwarding plane by shifting the intelligence of the network into one or more SDN controllers that oversee the switches. SDN facilitates rapid and open innovation at the network layer by providing a programmable network infrastructure.

An SDN network typically includes multiple switches interconnected with each other and one or more SDN controllers that control the forwarding behavior of the switches. An SDN controller can control the programming of flow tables in the switches to implement any forwarding protocol.

OpenFlow is a communication protocol that enables SDN controllers and switches in an SDN network to communicate with each other. An OpenFlow switch includes a packet processing pipeline that includes one or more flow tables. Each flow table includes one or more flow entries, where each flow entry includes a packet matching criteria and a set of instructions. When an incoming packet matches the packet matching criteria of a flow entry, the corresponding set of instructions of that flow entry are executed. The set of instructions may instruct the switch to perform various operations on the packet including, but not limited to, forwarding the packet to a given port, modifying certain bits in the packet header, encapsulating the packet, and dropping the packet.

The packet processing pipeline of an OpenFlow switch can become extremely complex. For example, an SDN controller may program the packet processing pipeline of a switch to include multiple flow tables and multiple flow entries within those flow tables. The flow entries can include instructions that direct packets to other flow tables. With such a complex processing pipeline, when a packet does not traverse its intended packet processing path, it can become extremely difficult to troubleshoot.

SUMMARY

A method is implemented by a switch in a Software Defined Networking (SDN) network to trace packets in the SDN network, where the switch includes a packet processing pipeline that includes a plurality of flow tables. The method includes receiving a first packet, determining, at a first flow table of the packet processing pipeline, whether the first packet is to be traced, punting a copy of the first packet to an SDN controller and directing the first packet to a second flow table of the packet processing pipeline in response to a determination at the first flow table that the first packet is to be traced, receiving, from the SDN controller, a second packet and an indication that the second packet is to be directed to a third flow table of the packet processing pipeline, determining, at the first flow table, whether the second packet is to be traced, setting a first field associated with the second packet to indicate that tracing is disabled for the second packet in response to a determination at the first flow table that the second packet is to be traced, and directing the second packet to the third flow table, wherein a second field associated with the second packet is set to indicate that tracing is enabled for the second packet.

A network device configured to function as a switch in a Software Defined Networking (SDN) network to trace packets in the SDN network, where the switch includes a packet processing pipeline that includes a plurality of flow tables. The network device includes a set of one or more processors and a non-transitory machine-readable storage medium having stored therein a packet tracing component. The packet tracing component, when executed by the set of one or more processors, causes the network device to receive a first packet, determine, at a first flow table of the packet processing pipeline, whether the first packet is to be traced, punt a copy of the first packet to an SDN controller and direct the first packet to a second flow table of the packet processing pipeline in response to a determination at the first flow table that the first packet is to be traced, receive, from the SDN controller, a second packet and an indication that the second packet is to be directed to a third flow table of the packet processing pipeline, determine, at the first flow table, whether the second packet is to be traced, set a first field associated with the second packet to indicate that tracing is disabled for the second packet in response to a determination at the first flow table that the second packet is to be traced, and direct the second packet to the third flow table, wherein a second field associated with the second packet is set to indicate that tracing is enabled for the second packet.

A non-transitory machine-readable medium has computer code stored therein, which when executed by a set of one or more processors of a network device functioning as a switch in a Software Defined Networking (SDN) network, causes the network device to perform operations for tracing packets in the SDN network, where the switch includes a packet processing pipeline that includes a plurality of flow tables. The operations include receiving a first packet, determining, at a first flow table of the packet processing pipeline, whether the first packet is to be traced, punting a copy of the first packet to an SDN controller and directing the first packet to a second flow table of the packet processing pipeline in response to a determination at the first flow table that the first packet is to be traced, receiving, from the SDN controller, a second packet and an indication that the second packet is to be directed to a third flow table of the packet processing pipeline, determining, at the first flow table, whether the second packet is to be traced, setting a first field associated with the second packet to indicate that tracing is disabled for the second packet in response to a determination at the first flow table that the second packet is to be traced, and directing the second packet to the third flow table, wherein a second field associated with the second packet is set to indicate that tracing is enabled for the second packet.

BRIEF DESCRIPTION OF THE DRAWINGS

The invention may best be understood by referring to the following description and accompanying drawings that are used to illustrate embodiments of the invention. In the drawings:

FIG. 7A illustrates connectivity between network devices (NDs) within an exemplary network, as well as three exemplary implementations of the NDs, according to some embodiments.

FIG. 7B illustrates an exemplary way to implement a special-purpose network device according to some embodiments.

DETAILED DESCRIPTION

Figure 1:
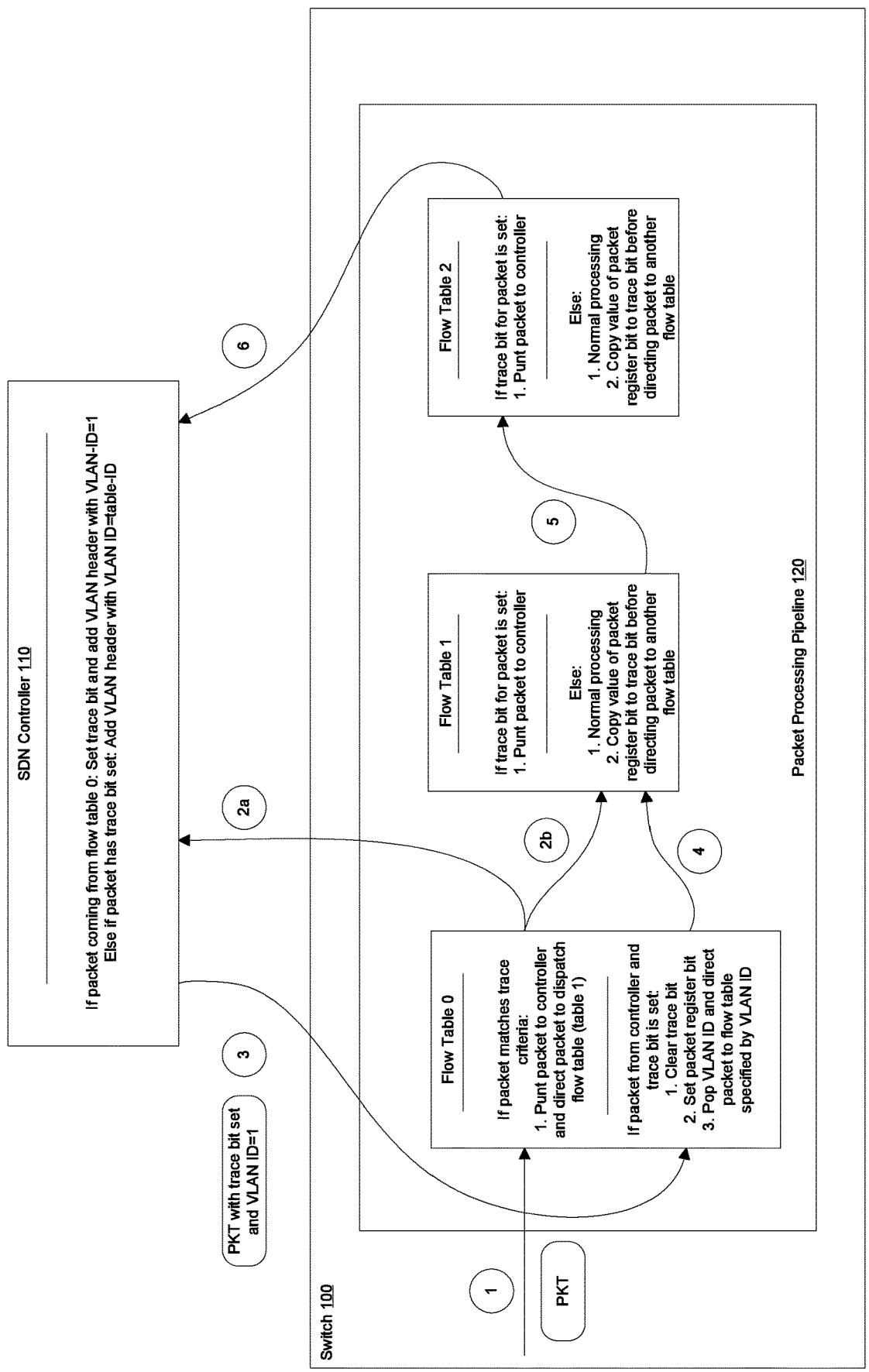
FIG. 1 is a diagram illustrating operations for tracing packets in an SDN network, according to some embodiments.
Figure 1:
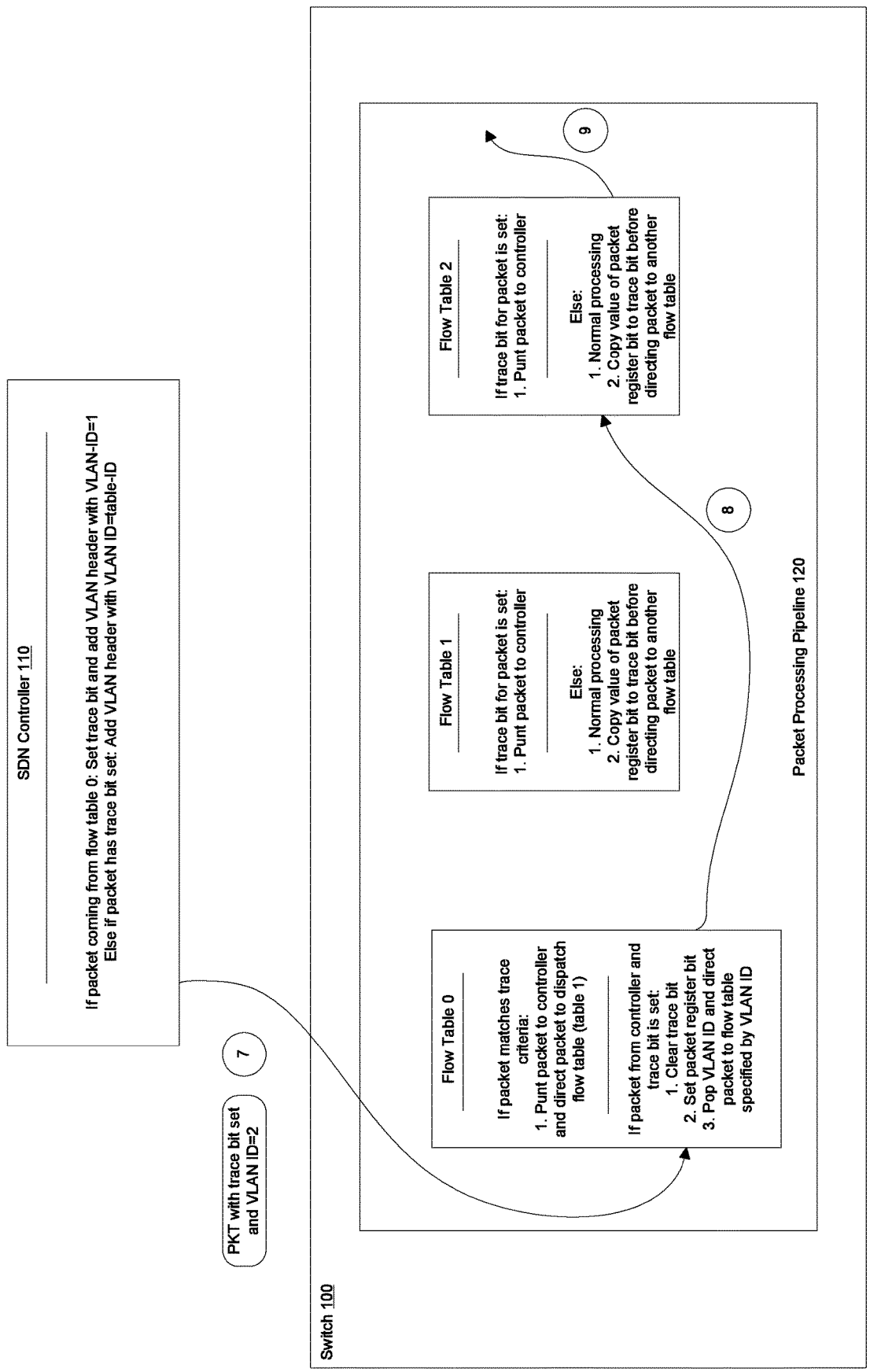

The following description describes methods and apparatus for tracing packets in a Software Defined Networking (SDN) network. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Packet processing pipelines in SDN switches are becoming increasingly complex. As a result, when packets do not traverse their intended packet processing path, it can become extremely difficult to troubleshoot. One conventional technique for troubleshooting packet processing in an SDN network sends a small "postcard" every time a packet visits a switch. A postcard is a truncated copy of the packet's header, augmented with an indication of the matching flow entry, an indication of the switch, and an indication of the output port. A collector module collects such postcards and is able to trace the packet based on an analysis of the collected postcards.

A drawback of this technique is that the switch executes a modified version of the control flow than what the SDN controller had originally programmed. With this technique, a proxy module intercepts flow modification messages sent by the SDN controller and dynamically modifies the flow modification messages so that they instruct the switch to output postcards to a collector module. Modifying flow entries in this way without involvement of the SDN controller may cause various operational issues. For example, during troubleshooting, flow entries in the switch may become out-of-sync with the flow entries installed by the SDN controller.

Another drawback of this technique is that it requires additional processing and bandwidth, even when troubleshooting is not needed. With this technique, postcards are generated for every packet at every switch. This consumes additional processing resources at switches and also consumes additional bandwidth (e.g., on the path between the switch and the collector module). It is estimated that sending postcards with this technique results in sustained traffic increase of thirty percent.

Another technique for tracing packets in an SDN network marks packets that are to be traced. For example, a packet can be marked for tracing by setting a value in a metadata field associated with the packet. When the packet arrives at a flow table of a packet processing pipeline, a tracing component of the flow table determines whether tracing is enabled for the packet based on the value in the metadata field associated with the packet. If the tracing component determines that tracing is enabled for the packet, then the tracing component sends a trace message for the packet to a trace collector. The tracing component then clears the value in the metadata field associated with the packet (to indicate that tracing is disabled for the packet) and resubmits the packet to the flow table. This way, the packet is matched against normal (non-tracing) flow entries in the flow table (e.g., the same flow entries that the packet would have been matched against if tracing was disabled).

This technique relies on the switch being able to resubmit a packet to a flow table in the packet processing pipeline. Although many software-based switches (e.g., Open vSwitch) support the ability to resubmit packets to a flow table, this feature is not included in the current OpenFlow specification and is not implemented by many hardware-based OpenFlow switches. As a result, some switches (e.g., software-based switches that implement a vanilla OpenFlow specification without resubmit extensions and hardware-based switches) may not be able to use the technique mentioned above to trace packets.

Embodiments disclosed herein improve upon the technique described above by enabling tracing of packets without using a resubmit action. This allows switches that do not support the resubmit action to trace packets. According to some embodiments, when a switch receives a packet belonging to a flow, the switch determines, at a first flow table of a packet processing pipeline, whether the packet is to be traced. If the packet is to be traced, then the switch punts a copy of the packet to an SDN controller and directs the packet to a second flow table of the packet processing pipeline. The copy of the packet that is punted to the SDN controller is a trace packet that is to be traced through the packet processing pipeline, while the packet that is directed to the second flow table is processed through the packet processing pipeline normally (without tracing). In this way, the switch creates a copy of the packet for tracing purposes, while allowing the original packet to be processed normally without disruption. Upon receiving the copy of the packet from the switch, the SDN controller may set a first field associated with the packet to indicate that tracing is enabled for the packet and send the packet back to the switch. As the switch processes the packet through the packet processing pipeline, the switch may punt the packet to the SDN controller for tracing purposes when the switch determines that the packet is to be traced based on content of the first field associated with the packet (e.g., bit in a metadata field associated with the packet). Whenever the SDN controller receives a trace packet punted from the switch, the SDN controller may log the packet and send the packet back to the switch, along with an indication that the packet is to be directed to the flow table from which the packet was punted to the SDN controller.

According to some embodiments, the switch may receive a trace packet from the SDN controller, along with an indication that the packet is to be directed to a third flow table of the packet processing pipeline. This packet may be a trace packet that the switch previously punted to the SDN controller at the third flow table. The switch determines, at the first flow table, whether the packet is to be traced based on content of the first field associated with the packet. If the packet is to be traced, then the switch sets the first field associated with the packet to indicate that tracing is disabled for the packet and directs the packet to the third flow table. This allows the packet to resume processing from where it was previously punted to the SDN controller. Before the packet is directed to the third flow table, a second field associated with the packet (e.g., a bit in a packet register field associated with the packet) is set to indicate that tracing is enabled for the packet. At the third flow table, the switch processes the packet normally, but also copies content of the second field associated with the packet to the first field associated with the packet before directing the packet to a fourth flow table of the packet processing pipeline. This allows the packet to be traced at the fourth flow table (if the packet is a trace packet). Similar operations as described above can be repeated to trace the packet at subsequent flow tables.

Embodiments disclosed herein can be seen as mimicking a resubmit action by involving the SDN controller, instead of having the switch itself perform a resubmit action. This is advantageous because the resubmit action is not part of the OpenFlow specification and is not implemented by many hardware-based OpenFlow switches. Although embodiments disclosed herein may involve punting a packet to an SDN controller whenever a packet arrives at a flow table, this may be acceptable since this only occurs for the copy of the packet (the trace packet). The original packet is not impacted by the tracing implementation.

FIG. 1 is a diagram illustrating operations for tracing packets in an SDN network, according to some embodiments. For purposes of illustration, the operations are described in the context of an SDN network that includes an SDN controller 110 and a switch 100. In one embodiment, the SDN controller 110 controls the forwarding behavior of the switch 100 using a southbound communications protocol (e.g., OpenFlow). The switch 100 includes a packet processing pipeline 120 that includes multiple flow tables. For purposes of illustration, the packet processing pipeline 120 is shown as including three flow tables (flow table 0, flow table 1, and flow table 2). It should be understood, however, that the packet processing pipeline120 could include additional flow tables. For purposes of illustration, embodiments will primarily be described in a context where the SDN controller 110 and the switch 100 implement OpenFlow. It should be understood, however, that this is by way of example and not intended to be limiting. The packet tracing techniques and concepts disclosed herein can also be implemented using other SDN implementations.

At operation 1, the switch 100 receives a packet. Packet processing for the packet starts at flow table 0. According to flow table 0, if a packet matches a trace criteria, then the switch 100 punts a copy of the packet to the SDN controller 110 and directs the original packet to flow table 1. In this example, the packet is assumed to match the trace criteria (the packet is to be traced). As such, at operation 2a, a copy of the packet is punted to the SDN controller 110 and at operation 2b, the packet is directed to flow table 1. The copy of the packet that is punted to the SDN controller 110 is a trace packet that is to be traced through the packet processing pipeline 120, while the packet that is directed to flow table 1 is to be processed normally (without tracing). As used herein, "punting" a packet to an SDN controller 110 refers to sending the packet (or a relevant subset thereof) to the SDN controller 110, usually with information related to the packet itself and the context in which the packet was sent to the SDN controller 110. In one embodiment, the switch 100 punts a packet to the SDN controller 110 using an OpenFlow Packet-In message. The SDN controller 110 may send a punted packet back to the switch 100, for example, along with instructions on how to process the packet. In one embodiment, the SDN controller 110 sends a punted packet back to the switch 100 using an OpenFlow Packet-Out message.

When the SDN controller 110 receives the copy of the packet that was punted to it as part of operation 2a, the SDN controller 110 may log the packet for tracing purposes. In one embodiment, logging the packet entails storing information about the packet (e.g., which flow table the packet was punted from, the packet matching criteria that the packet matched, and other information related to the packet itself and the context in which the packet was punted to the SDN controller 110). The SDN controller 110 is configured such that if the packet is being punted from flow table 0, then the SDN controller 110 sets the trace bit for the packet and adds a Virtual Local Area Network (VLAN) header to the packet with VLAN Identifier (VLAN ID) set to 1. In one embodiment, the trace bit is a bit in a metadata field (e.g., OpenFlow metadata field) associated with the packet. Setting the trace bit for the packet indicates that the packet is a trace packet. The VLAN ID in the VLAN header indicates the flow table from which packet processing should be resumed (in this example VLAN ID is set to 1 to indicate that the packet processing for the packet should resume at flow table 1). The SDN controller 110 is further configured such that if the trace bit for the packet is set, then the SDN controller 110 adds a VLAN header to the packet with VLAN ID set to the table ID of the flow table from which the packet was punted to the SDN controller 110. In this example, the packet was punted to the SDN controller from flow table 0. As such, the SDN controller 110 sets the trace bit for the packet and adds a VLAN header with VLAN ID set to 1. At operation 3, the SDN controller 110 sends this packet back to the switch 100 (e.g., as part of an OpenFlow Packet-Out message).

When the switch 100 receives the packet, packet processing starts at flow table 0. According to flow table 0, if the packet is coming from the SDN controller 110 and the trace bit for the packet is set, then the switch 100 clears the trace bit, sets the packet register bit, pops the outermost Virtual Local Area Network Identifier (VLAN ID), and directs the packet to the flow table specified by the VLAN ID. In one embodiment, the packet register bit is a bit in a packet register field (e.g., OpenFlow packet register field) associated with the packet. As will become apparent from the descriptions to follow, clearing the trace bit allows the packet to be processed at the flow table specified by the VLAN ID normally (without tracing). Also, as will become apparent from the descriptions to follow, setting the packet register bit allows the trace bit to be set again when the packet is directed to another flow table. Continuing with the example, since the packet came from the SDN controller 110 and has its trace bit set, the switch 100 clears the trace bit for the packet, sets the packet register bit for the packet, pops the outermost VLAN header of the packet, and at operation 4, directs the packet to the flow table specified by the VLAN ID in the VLAN header, which in this example is flow table 1 (since VLAN ID is set to 1).

According to flow table 1, if the trace bit for a packet is set, then the switch 100 punts the packet to the SDN controller 110. Otherwise, the switch 100 performs normal packet processing. As part of the normal processing, the switch 100 copies the value of the packet register bit to the trace bit before directing the packet to another flow table. This ensures that the packet can be traced at the next flow table. In one embodiment, the SDN controller 110 programs the switch 110 to copy the value of the packet register bit to the trace bit before directing the packet to another flow table. This can be implemented, for example, by adding a copy instruction to a flow entry. Thus, in an OpenFlow implementation, no extensions to OpenFlow are needed to implement this feature. Continuing with the example, the packet that arrived at flow table 1 as part of operation 4 has its trace bit cleared. As such, the switch 100 performs normal packet processing. It is assumed in this example that normal packet processing for the packet entails directing the packet to flow table 2. However, before the packet is directed to flow table 2, the switch 100, as part of normal processing, copies the value of the packet register bit to the trace bit. In this example, since the packet register bit for the packet was previously set at flow table 0, copying the value of the packet register bit to the trace bit sets the trace bit for the packet. At operation 5, this packet is directed to flow table 2.

Flow table 2 is configured similarly to flow table 1. According to flow table 2, if the trace bit for a packet is set, then the switch 100 punts the packet to the SDN controller 110. Otherwise, the switch 100 performs normal packet processing and copies the value of the packet register bit to the trace bit before directing the packet to another flow table. In this example, the packet that arrived at flow table 2 as part of operation 5 has its trace bit set. As such, at operation 6, the switch 100 punts the packet to the SDN controller 110.

When the SDN controller 110 receives the packet that was punted from flow table 2 as part of operation 6, the SDN controller 110 may log the packet for tracing purposes. Also, in this example, since the packet is punted from flow table 2 (and not flow table 0), the SDN controller 110 adds a VLAN header to the packet with VLAN ID set to 2. At operation 7, the SDN controller 110 sends this packet back to the switch 100. It should be noted that the trace bit for the packet has not been modified and thus is still set.

When the switch 100 receives the packet, packet processing starts at flow table 0. Since the packet is from the SDN controller 110 and the trace bit for the packet is set, the switch 100 clears the trace bit for the packet, sets the packet register bit for the packet, pops the outermost VLAN header of the packet, and at operation 8, directs the packet to the flow table specified by the VLAN ID in the VLAN header, which in this example is flow table 2 (since VLAN ID is set to 2).

In this example, the packet that arrived at flow table 2 as part of operation 8 has its trace bit cleared. As such, the switch 100 performs normal packet processing. It is assumed in this example that normal packet processing for the packet entails directing the packet to another flow table. Before the packet is directed to another flow table, however, the switch 100 copies the value of the packet register bit to the trace bit. In this example, since the packet register bit for the packet was previously set at flow table 0, copying the value of the packet register bit to the trace bit sets the trace bit for the packet. At operation 9, this packet is directed to another flow table. The switch 100 and the SDN controller 110 may perform similar operations to trace the packet through the rest of the packet processing pipeline 120.

In one embodiment, packet tracing is enabled in an SDN network by setting up a tracing infrastructure. The tracing infrastructure may include a mark and forward component and one or more tracing components at a switch 100.

The mark and forward component has two main functions. The first function of the mark and forward component is to create a copy of a packet for tracing purposes (which is sometimes referred to herein as a trace packet). The second function of the mark and forward component is to direct trace packets coming from the SDN controller 110 to the appropriate flow table to resume packet processing. In one embodiment, the mark and forward component is implemented as a flow table in the packet processing pipeline 120 of the switch 100 (e.g., flow table 0 shown in FIG. 1). This flow table 115 may be referred to herein as a mark and forward component flow table.

The first function of the mark and forward component is to create a copy of a packet for tracing purposes. This may be achieved by adding one or more flow entries in the mark and forward component flow table. For example, a flow entry may be added in the mark and forward component flow table that includes a packet matching criteria that matches packets belonging to a flow that is to be traced and a corresponding set of instructions that instruct the switch 100 to punt a copy of a packet matching the packet matching criteria to the SDN controller 110 and direct the packet to a flow table.

Table I is a table that lists exemplary flow entries that can be included in a mark and forward component flow table.

TABLE I

| Packet Matching Criteria | Instructions |
|---|---|
| Source IP address = 10.1.1.1 | Punt packet to SDN controller |
| | Direct packet to flow table 1 |
| Source IP address = 10.2.2.2; | Punt packet to SDN controller |
| Destination IP address = 11.1.1.1 | Direct packet to flow table 1 |

The first flow entry matches packets that have a source IP address of 10.1.1.1. According to the instructions of the first flow entry, when a packet matches the first flow entry, the switch 100 punts the packet to the SDN controller 110 and also directs the packet to flow table 1. The second flow entry matches packets that have a source IP address of 10.2.2.2 and a destination IP address of 11.1.1.1. According to the instructions of the second flow entry, when a packet matches the second flow entry, the switch 100 punts the packet to the SDN controller 110 and also directs the packet to flow table 1. For sake of illustration, Table I shows two flow entries. It should be understood, however, that the mark and forward component flow table can include additional flow entries to create a copy of a packet for tracing purposes (e.g., one for each flow that is to be traced).

The second function of the mark and forward component is to direct packets coming from the SDN controller 110 to the appropriate flow table to resume packet processing. This may be achieved by adding one or more flow entries in the mark and forward component flow table. For example, a flow entry may be added in the mark and forward component flow table that includes a packet matching criteria that matches packets coming from the SDN controller 110 that have its trace bit set and a corresponding set of instructions that instruct the switch 100 to clear the trace bit, set a packet register bit for the packet, pop the outermost VLAN header of the packet, and direct the packet to the flow table specified by the VLAN ID in the VLAN header.

Table II is a table that lists exemplary flow entries that can be included in a mark and forward component flow table.

TABLE II

| Packet Matching Criteria | Instructions |
|---|---|
| Packet from SDN controller; AND Trace bit is set; AND VLAN-ID in outermost VLAN header is 1 | Clear trace bit Set packet register bit Pop outermost VLAN header Direct packet to flow table 1 |
| Packet from SDN controller; AND Trace bit is set; AND VLAN-ID in outermost | Clear trace bit Set packet register bit Pop outermost VLAN header |

TABLE II-continued

| Packet Matching Criteria | Instructions |
| --- | --- |
| VLAN header is 2 | Direct packet to flow table 2 |
| Packet from SDN controller; AND Trace bit is set; AND VLAN-ID in outermost VLAN header is 3 | Clear trace bit Set packet register bit Pop outermost VLAN header Direct packet to flow table 3 |

The first flow entry matches packets that are from the SDN controller 110, have their trace bit set, and have a VLAN ID in the outermost VLAN header set to 1. According to the instructions of the first flow entry, when a packet matches the first flow entry, the switch 100 clears the trace bit, sets the packet register bit, pops the outermost VLAN header, and directs the packet to flow table 1. The second flow entry matches packets that are from the SDN controller 110, have its trace bit set, and have a VLAN ID in the outermost VLAN header set to 2. According to the instructions of the second flow entry, when a packet matches the second flow entry, the switch 100 clears the trace bit, sets the packet register bit, pops the outermost VLAN header, and directs the packet to flow table 2. The third flow entry matches packets that are from the SDN controller 110, have its trace bit set, and have a VLAN ID in the outermost VLAN header set to 3. According to the instructions of the third flow entry, when a packet matches the third flow entry, the switch 100 clears the trace bit, sets the packet register bit, pops the outermost VLAN header, and directs the packet to flow table 3. For sake of illustration, Table II shows three flow entries. It should be understood, however, that the mark and forward component flow table can include additional flow entries to direct packets coming from the SDN controller 110 to the appropriate flow table (e.g., one for each flow table that performs tracing).

In one embodiment, each flow table at which tracing is to be performed has a tracing component. The tracing component for a flow table may be implemented as a flow entry in that flow table (e.g., flow entry that performs the "if" operation in flow table 1 shown in FIG. 1). This flow entry may be referred to herein as a tracing component flow entry of the flow table. The function of the tracing component is to punt packets that have their trace bit set to the SDN controller 110. A tracing component flow entry of a flow table may include a packet matching criteria that matches packets that have their trace bit set and a corresponding set of instructions that instruct the switch 100 to punt the packet to the SDN controller 110 (for tracing purposes). In one embodiment, the tracing component flow entry of the flow table is the highest priority flow entry in the flow table to ensure that packet tracing is performed (if needed) before matching the packet against normal (non-tracing) flow entries.

Table III is a table that lists an exemplary tracing component flow entry of a flow table.

TABLE III

| Packet Matching Criteria | Instructions |
| --- | --- |
| Trace bit is set | Punt packet to SDN controller |

The flow entry matches packets that have their trace bits set. According to the instructions of the flow entry, when a packet matches the flow entry, the switch 100 punts the packet to the SDN controller 110.

In one embodiment, a normal (non-tracing) flow entry in a flow table is modified to include instructions that instruct the switch 100 to copy the value of the packet register bit to the trace bit before directing the packet to another flow table of the packet processing pipeline 120. This allows trace packets to be traced at the next flow table.

Table IV is a table listing a flow entry before it is modified and Table V is a table listing the flow entry after it is modified.

TABLE IV

| Packet Matching Criteria | Instructions |
| --- | --- |
| Source IP address = 1.1.1.1 | Action X Action Y |

TABLE V

| Packet Matching Criteria | Instructions |
| --- | --- |
| Source IP address = 1.1.1.1 | Action X Action Y Copy value of packet register bit to trace bit |

The original flow entry (as shown in Table IV) matches packets that have a source IP address of 1.1.1.1. According to the instructions of the original flow entry, when a packet matches the flow entry, the switch 100 performs action X and action Y (which could be arbitrary actions). The modified flow entry (as shown in Table V) is similar to the original flow entry shown in Table IV except that it includes an additional instruction to copy the value of the packet register bit to the trace bit.

The SDN controller 110 has several functions with respect to the tracing infrastructure. One function is to set up the mark and forward component at the switch 100. Another function of the SDN controller 110 is to set up one or more tracing components at the switch 100. Yet another function of the SDN controller 110 is to process packets that are punted to it from the switch 100. This may include analyzing the packet and logging/storing information about the packet (e.g., which flow table the packet was punted from, the packet matching criteria that the packet matched, and other information related to the packet itself and the context in which the packet was punted to the SDN controller 110). In one embodiment, the SDN controller 110 checks whether the packet was punted from the flow table that implements the mark and forward component (e.g., flow table 0). If so, the SDN controller 110 sets the trace bit for the packet and adds a VLAN header with VLAN ID set to 1. In addition, the SDN controller 110 may check whether the packet was punted from an egress flow table. If so, this indicates the end of tracing for the packet (at least within the current switch 100). As such, in this case, the SDN controller 110 may not send the packet back to the switch 100. If the packet was punted from any other flow table, then the SDN controller 110 adds a VLAN header to the packet with VLAN ID set to the table ID of the flow table from which the packet was punted from.

Figure 2:
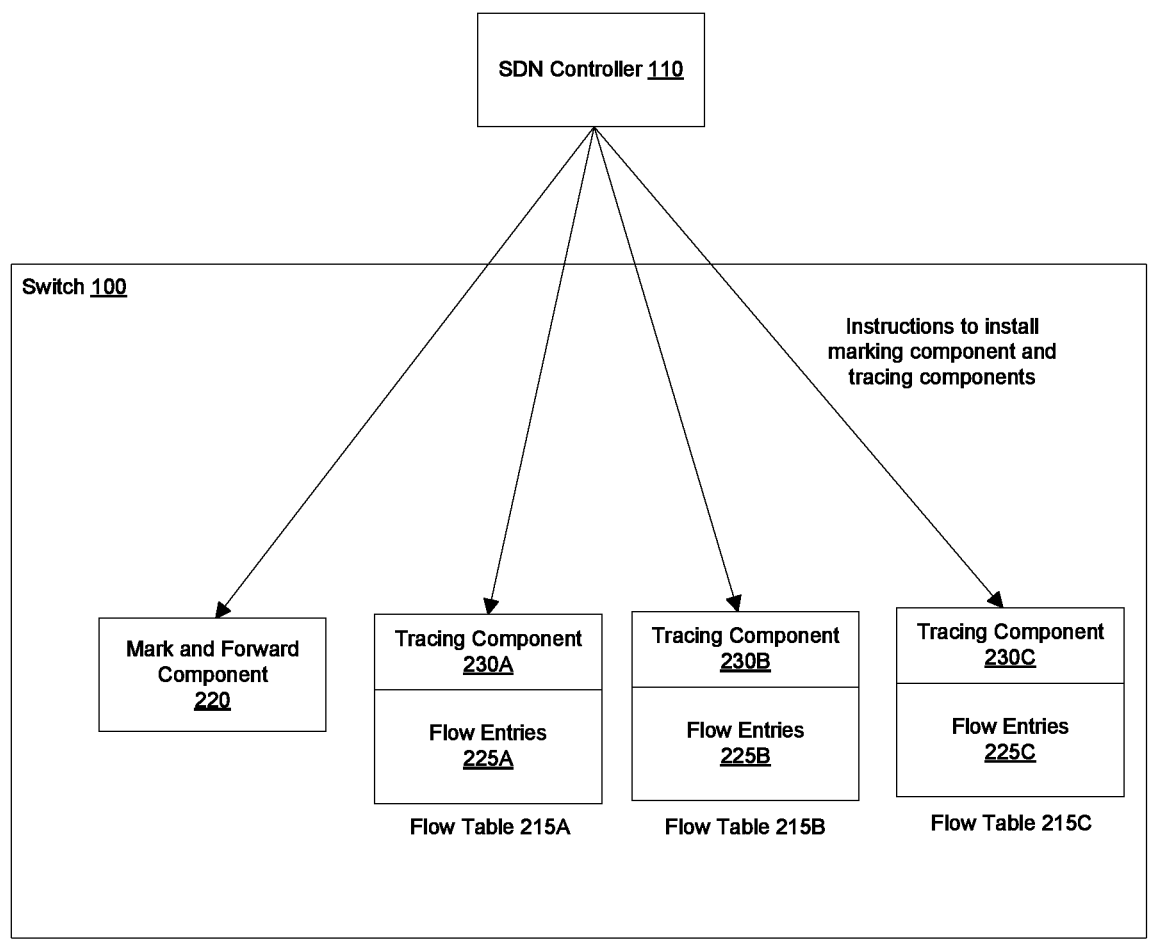
FIG. 2 is a diagram illustrating an SDN controller setting up a tracing infrastructure in a switch, according to some embodiments.

FIG. 2 is a diagram illustrating an SDN controller setting up a tracing infrastructure in a switch, according to some embodiments. In one embodiment, the SDN controller 110 sets up the tracing infrastructure in the switch 100 by instructing the switch 100 to generate a mark and forward component 220 and one or more tracing components 230A-

C. For example, the SDN controller 110 may instruct the switch 100 to generate a mark and forward component flow table (to serve as the mark and forward component 220) and one or more tracing component flow entries (to serve as tracing components 230A-C). As shown in the diagram, the packet tracing infrastructure includes a tracing component 230 for each flow table 215. It should be understood, however, that in other embodiments, only a subset of flow tables 215 may include a tracing component 230.

Figure 3:
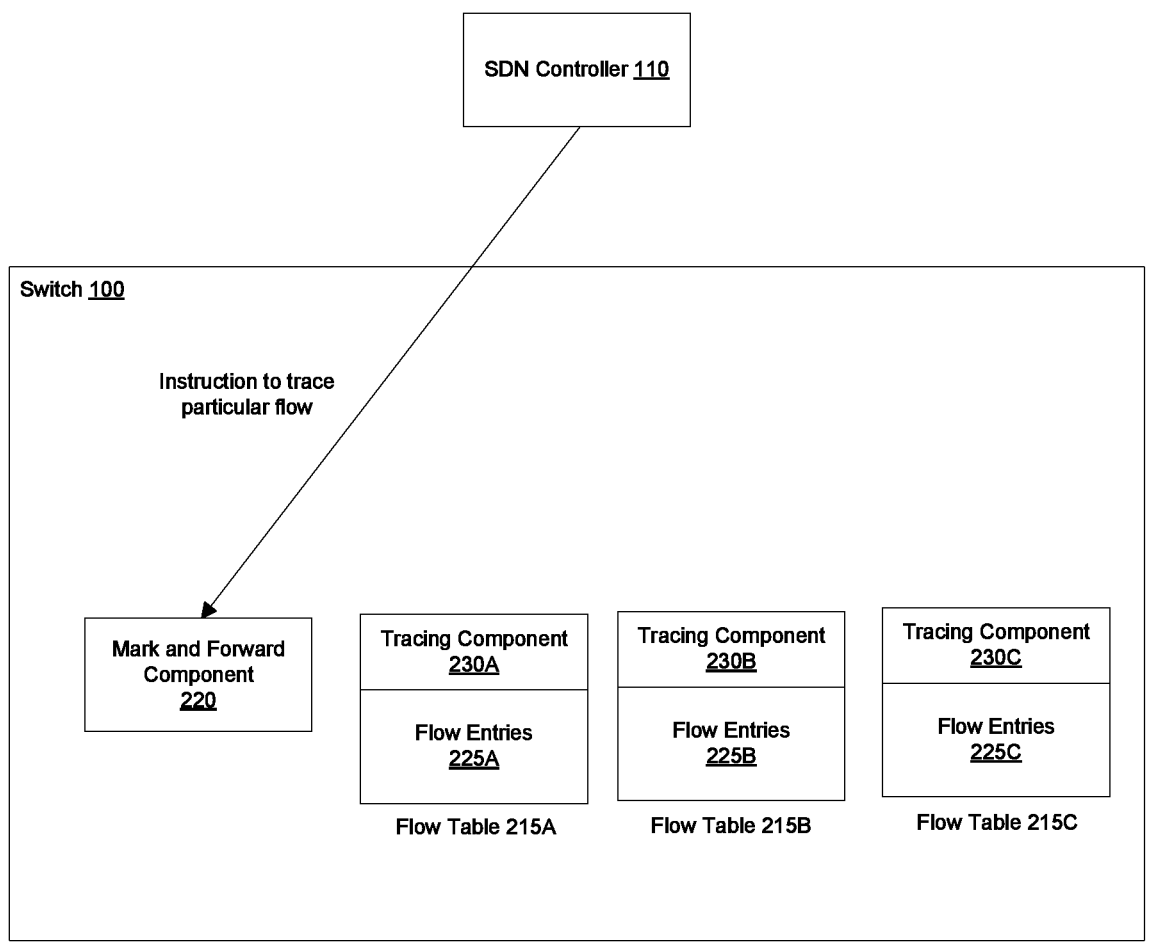
FIG. 3 is a diagram illustrating an SDN controller enabling tracing for a particular flow in a tracing infrastructure, according to some embodiments.

FIG. 3 is a diagram illustrating an SDN controller enabling tracing for a particular flow in a tracing infrastructure, according to some embodiments. Once the packet tracing infrastructure is setup, the SDN controller 110 may enable tracing for a particular flow by instructing the mark and forward component 220 to create copies of packets belonging to that flow (for tracing). For example, the SDN controller 110 may achieve this by instructing the switch 100 to generate a flow entry in the mark and forward component flow table that matches packets belonging to the flow and that includes a corresponding set of instructions that instruct the switch 100 to punt a copy of a packet matching the packet matching criteria to the SDN controller 110 and direct the packet to another flow table 215 for normal packet processing.

Figure 4:
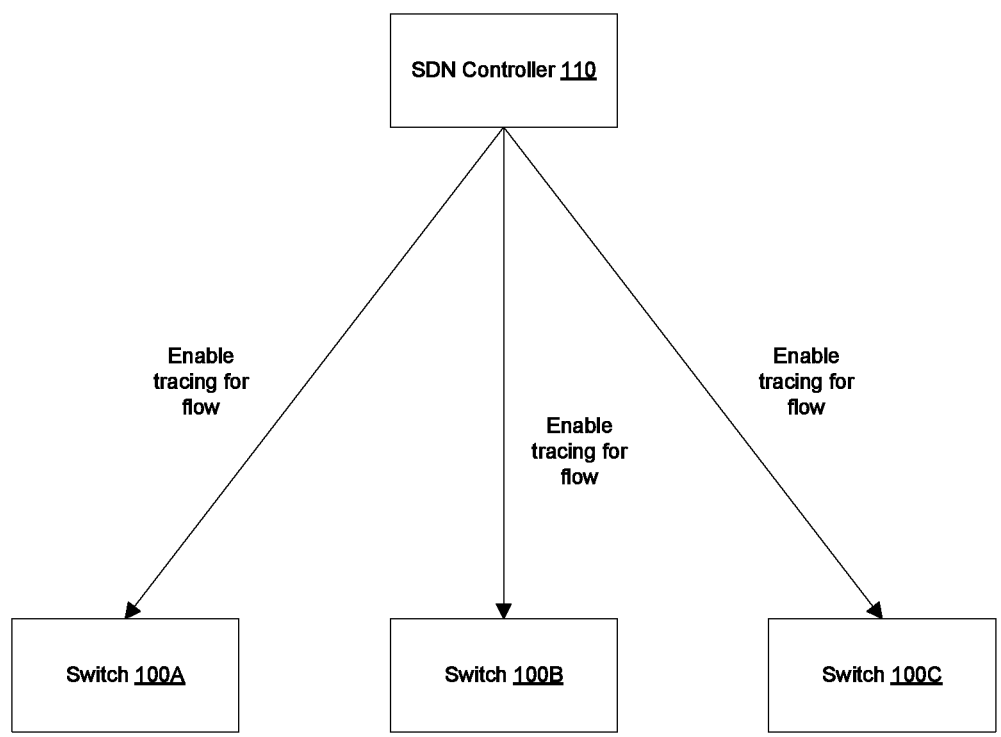
FIG. 4 is a diagram illustrating an SDN controller enabling tracing for a particular flow across multiple switches, according to some embodiments.

FIG. 4 is a diagram illustrating an SDN controller enabling tracing for a particular flow across multiple switches, according to some embodiments. As shown in the diagram, the SDN controller 110 may employ techniques described herein to enable packet tracing for a flow at multiple switches 100A-C. In this case, a given packet may be punted to the SDN controller (for tracing purposes) from multiple switches 100 (as the packet travels across the multiple switches 100). Also, a given packet may be punted to the SDN controller (for tracing purposes) multiple times within a given switch 100 (e.g., from multiple flow tables). In one embodiment, the SDN controller 110 may use a portion of the packet's payload (e.g., first n bytes of the payload) to identify the packet. This may help distinguish the packet from other packets that are part of the same flow (e.g., have same or similar header information). This allows the SDN controller 110 to have a comprehensive view of the path that a particular packet traversed, both at the switch 100 level and at the flow table level.

Figure 5:
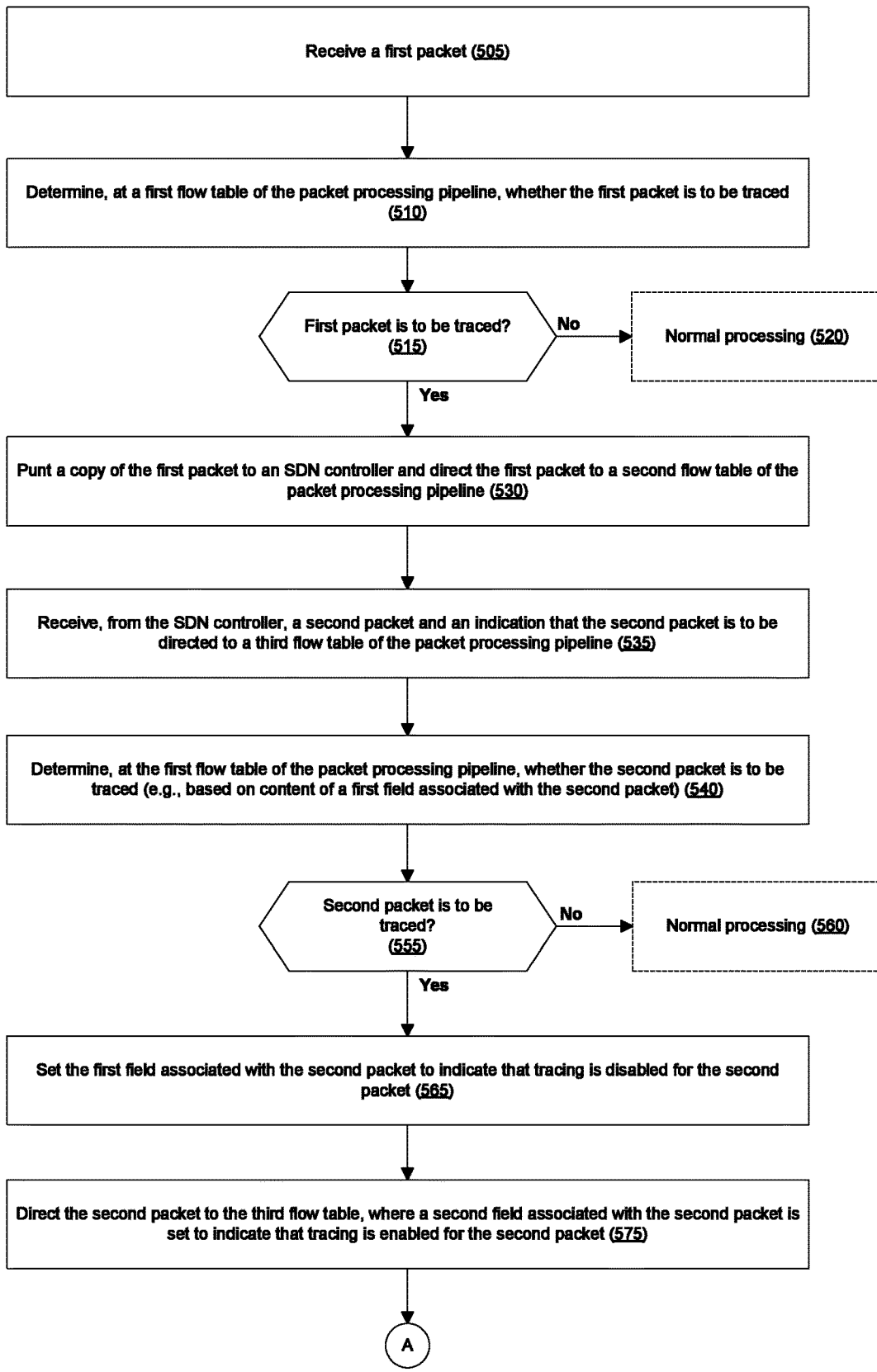
FIG. 5 is a flow diagram of a process for tracing packets in an SDN network, according to some embodiments.
Figure 5:
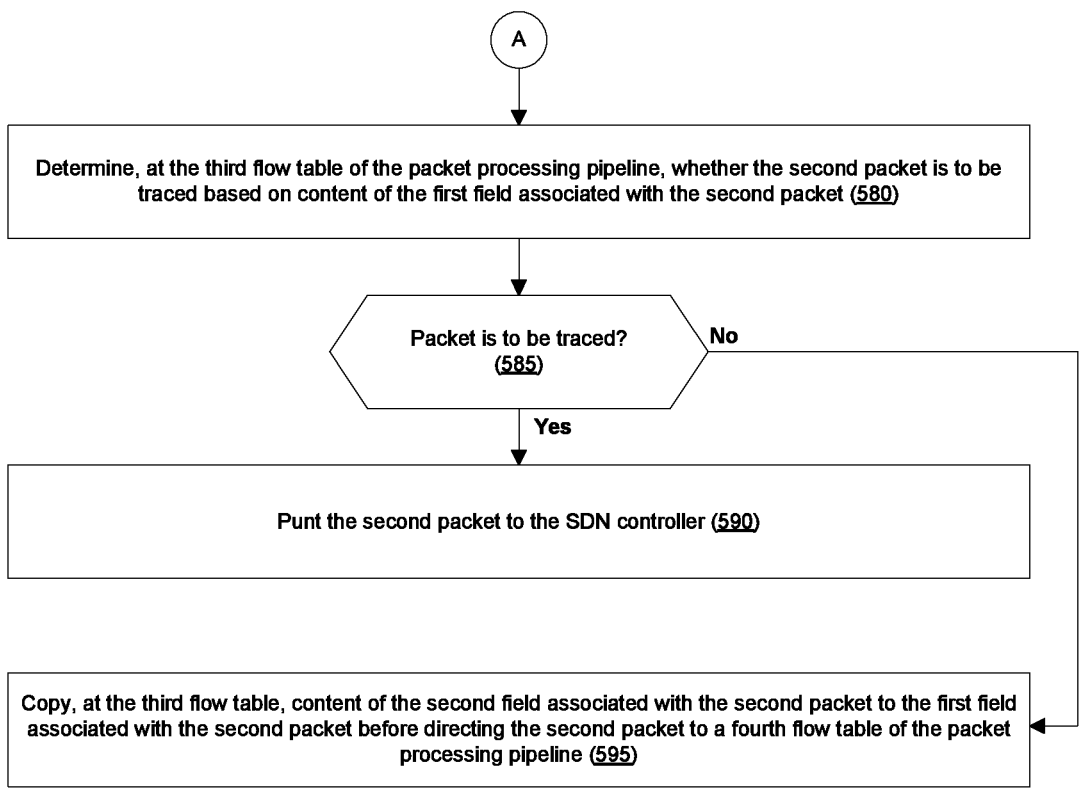

FIG. 5 is a flow diagram of a process for tracing packets in an SDN network, according to some embodiments. In one embodiment, the process is implemented by a switch 100 in the SDN network. The switch 100 may include a packet processing pipeline 120 that includes a plurality of flow tables. The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

In one embodiment, the process is initiated when the switch 100 receives a first packet (block 505). The switch 100 determines, at the first flow table of the packet processing pipeline 120, whether the first packet is to be traced (block 510). At decision block 515, if the first packet is not to be traced, then the switch 100 processes the first packet normally (without tracing) (block 520). However, if the first packet is to be traced, then the switch 100 punts a copy of the first packet to an SDN controller 110 and directs the first packet to a second flow table of the packet processing pipeline 120 (block 530). In one embodiment, the packet that is directed to the second flow table is processed through the packet processing pipeline 120 without being traced. In one embodiment, the first packet is punted to the SDN controller 110 as part of an OpenFlow Packet-In message sent to the SDN controller 110.

The switch 100 may then receive, from the SDN controller 110, a second packet and an indication that the second packet is to be directed to a third flow table of the packet processing pipeline 120 (block 535). In one embodiment, the second packet is received from the SDN controller 110 as part of an OpenFlow Packet-Out message received from the SDN controller 110. In one embodiment, the indication that the second packet is to be directed to the third flow table is included in an outermost VLAN header added to the second packet (e.g., VLAN ID in the VLAN header). The switch 100 determines, at the first flow table of the packet processing pipeline 120, whether the second packet is to be traced (block 540). In one embodiment, the switch 100 determines whether the second packet is to be traced based on content of a first field associated with the second packet. In one embodiment, if the packet processing pipeline 120 is an OpenFlow packet processing pipeline, the first field associated with the second packet is a bit in a metadata field associated with the second packet. In one embodiment, the switch 100 determines whether the second packet is to be traced based on content of a second field associated with the second packet (e.g., if the second field can be matched). At decision block 555, if the second packet is not to be traced, then the switch 100 processes the second packet normally (without tracing) (block 560). However, if the first packet is to be traced, then the switch 100 sets the first field associated with the second packet to indicate that tracing is disabled for the second packet (block 565). In an embodiment where a VLAN header is added to the second packet (e.g., to indicate which flow table the second packet should be directed to), the switch 100 also pops the outermost VLAN header from the second packet. The switch 100 then directs the second packet to the third flow table, where a second field associated with the second packet is set to indicate that tracing is enabled for the second packet (block 575). In one embodiment, the second field associated with the second packet is a field that is not used for packet matching in the packet processing pipeline. For example, in one embodiment, if the packet processing pipeline 120 is an OpenFlow packet processing pipeline, the second field associated with the second packet is a bit in a packet register field associated with the second packet. In one embodiment, the second field associated with the second packet is already set when the second packet is received from the SDN controller 110 (e.g., because the second field associated with the second packet is set by the SDN controller 110). In another embodiment, the second field associated with the second packet is set by the switch 100.

The switch 100 determines, at the third flow table of the packet processing pipeline 120, whether the second packet is to be traced based on content of the first field associated with the second packet (block 580). At decision block 585, if the packet is to be traced, then the switch 100 punts the second packet to the SDN controller 110 (this may include sending content of the first field associated with the second packet to the SDN controller) (block 590). In one embodiment, the second packet is punted to the SDN controller 110 as part of an OpenFlow Packet-In message sent to the SDN controller 110. Returning to decision block 585, if the packet is not to be traced, then the switch 100 copies, at the third flow table, content of the second field associated with the second packet to the first field associated with the second packet before directing the second packet to a fourth flow table of the packet processing pipeline 120 (block 595).

Figure 6:
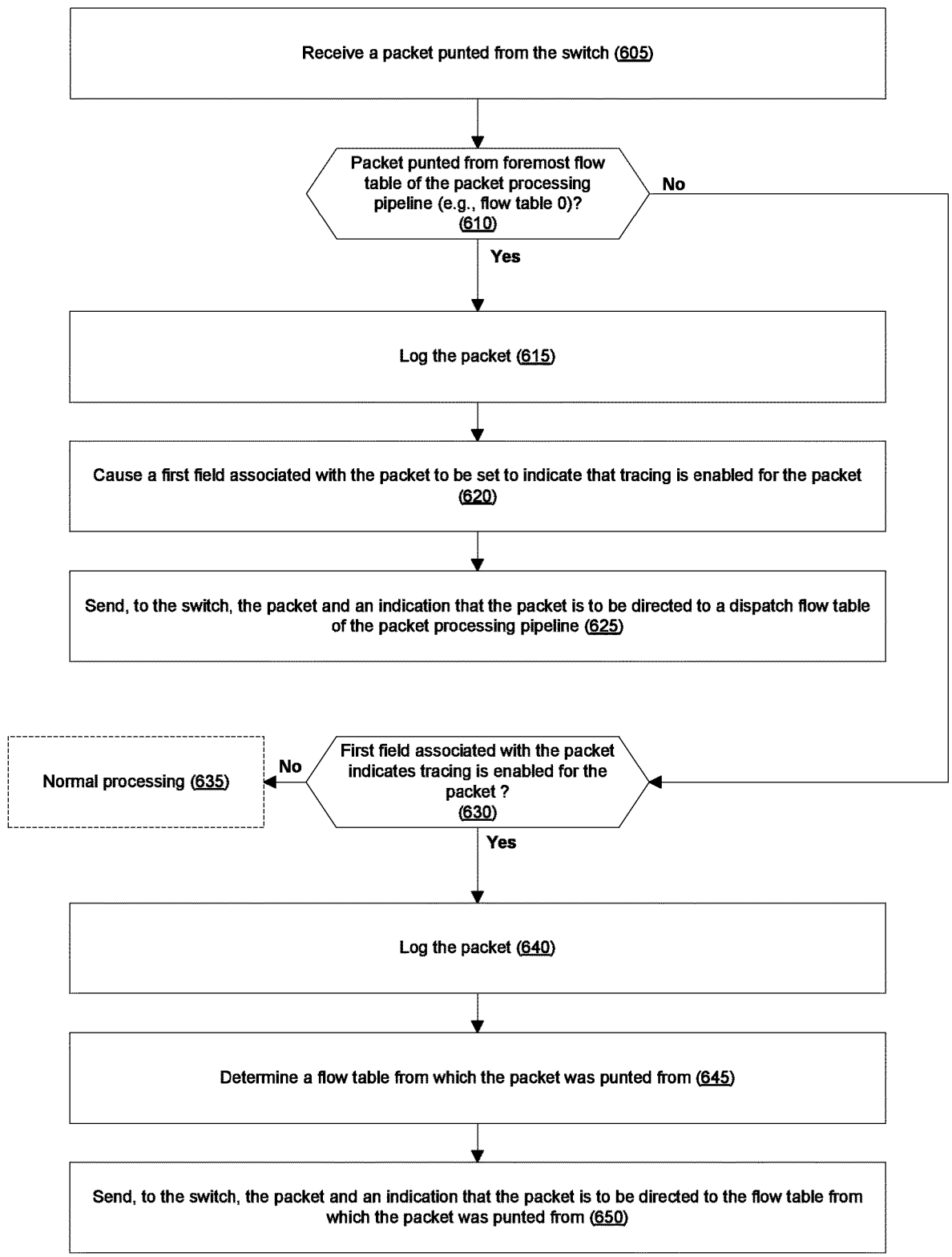
FIG. 6 is a flow diagram of a process for tracing packets in an SDN network, according to some embodiments.

FIG. 6 is a flow diagram of a process for tracing packets in an SDN network, according to some embodiments. In one embodiment, the process is implemented by an SDN controller 110 in the SDN network. The SDN controller 110 may be communicatively coupled to a switch 100 in the SDN network, where the switch 100 includes a packet processing pipeline 120 that includes a plurality of flow tables.

In one embodiment, the process is initiated when the SDN controller 110 receives a packet punted from the switch 100 (block 605). In one embodiment, the packet is punted to the SDN controller 110 as part of an OpenFlow Packet-In message sent by the switch 100 to the SDN controller 110. The switch 100 determines whether the packet was punted from the foremost flow table of the packet processing pipeline 120 (e.g., flow table 0) (or other flow table that implements the mark and forward component 220) (decision block 610). If so, the SDN controller 110 logs the packet (block 615), causes a first field associated with the packet to be set to indicate that tracing is enabled for the packet (block 620), and sends, to the switch 100, the packet and an indication that the packet is to be directed to a dispatch flow table of the packet processing pipeline 120 (or other flow table where normal (non-tracing) packet processing starts) (block 625). In one embodiment, if the packet processing pipeline 120 of the switch 100 is an OpenFlow packet processing pipeline, the first field associated with the packet is a bit in a metadata field associated with the packet. In one embodiment, the indication that the packet is to be directed to the dispatch flow table is included in an outermost VLAN header added to the packet (e.g., VLAN ID in the VLAN header). Returning to decision block 610, if the packet was not punted from the foremost flow table of the packet processing pipeline 120, then the SDN controller 110 determines whether the first field associated with the packet indicates that tracing is enabled for the packet (decision block 630). If not, the SDN controller 110 processes the packet normally (without tracing) (block 635). However, if the first field associated with the packet indicates that tracing is enabled for the packet, then the SDN controller 110 sends, to the switch 100, the packet and an indication that the packet is to be directed to the flow table from which the packet was punted from (block 650). In one embodiment, the indication that the packet is to be directed to the flow table from which the packet was punted from is included in an outermost VLAN header added to the packet (e.g., VLAN ID in the VLAN header).

FIG. 7A illustrates connectivity between network devices (NDs) within an exemplary network, as well as three exemplary implementations of the NDs, according to some embodiments of the invention. FIG. 7A shows NDs 700A-H, and their connectivity by way of lines between 700A-700B, 700B-700C, 700C-700D, 700D-700E, 700E-700F, 700F-700G, and 700A-700G, as well as between 700H and each of 700A, 700C, 700D, and 700G. These NDs are physical devices, and the connectivity between these NDs can be wireless or wired (often referred to as a link). An additional line extending from NDs 700A, 700E, and 700F illustrates that these NDs act as ingress and egress points for the network (and thus, these NDs are sometimes referred to as edge NDs; while the other NDs may be called core NDs).

Two of the exemplary ND implementations in FIG. 7A are: 1) a special-purpose network device 702 that uses custom application—specific integrated—circuits (ASICs) and a special-purpose operating system (OS); and 2) a general purpose network device 704 that uses common off-the-shelf (COTS) processors and a standard OS.

The special-purpose network device 702 includes networking hardware 710 comprising a set of one or more processor(s) 712, forwarding resource(s) 714 (which typically include one or more ASICs and/or network processors), and physical network interfaces (NIs) 716 (through which network connections are made, such as those shown by the connectivity between NDs 700A-H), as well as non-transitory machine readable storage media 718 having stored therein networking software 720. During operation, the networking software 720 may be executed by the networking hardware 710 to instantiate a set of one or more networking software instance(s) 722. Each of the networking software instance(s) 722, and that part of the networking hardware 710 that executes that network software instance (be it hardware dedicated to that networking software instance and/or time slices of hardware temporally shared by that networking software instance with others of the networking software instance(s) 722), form a separate virtual network element 730A-R. Each of the virtual network element(s) (VNEs) 730A-R includes a control communication and configuration module 732A-R (sometimes referred to as a local control module or control communication module) and forwarding table(s) 734A-R, such that a given virtual network element (e.g., 730A) includes the control communication and configuration module (e.g., 732A), a set of one or more forwarding table(s) (e.g., 734A), and that portion of the networking hardware 710 that executes the virtual network element (e.g., 730A).

Software 720 can include code such as packet tracing component 725, which when executed by networking hardware 710, causes the special-purpose network device 702 to perform operations of one or more embodiments described herein above as part networking software instances 722.

The special-purpose network device 702 is often physically and/or logically considered to include: 1) a ND control plane 724 (sometimes referred to as a control plane) comprising the processor(s) 712 that execute the control communication and configuration module(s) 732A-R; and 2) a ND forwarding plane 726 (sometimes referred to as a forwarding plane, a data plane, or a media plane) comprising the forwarding resource(s) 714 that utilize the forwarding table(s) 734A-R and the physical NIs 716. By way of example, where the ND is a router (or is implementing routing functionality), the ND control plane 724 (the processor(s) 712 executing the control communication and configuration module(s) 732A-R) is typically responsible for participating in controlling how data (e.g., packets) is to be routed (e.g., the next hop for the data and the outgoing physical NI for that data) and storing that routing information in the forwarding table(s) 734A-R, and the ND forwarding plane 726 is responsible for receiving that data on the physical NIs 716 and forwarding that data out the appropriate ones of the physical NIs 716 based on the forwarding table(s) 734A-R.

FIG. 7B illustrates an exemplary way to implement the special-purpose network device 702 according to some embodiments of the invention. FIG. 7B shows a special-purpose network device including cards 738 (typically hot pluggable). While in some embodiments the cards 738 are of two types (one or more that operate as the ND forwarding plane 726 (sometimes called line cards), and one or more that operate to implement the ND control plane 724 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 736 (e.g., a first full mesh coupling the line cards and a second full mesh coupling all of the cards).

Returning to FIG. 7A, the general purpose network device 704 includes hardware 740 comprising a set of one or more processor(s) 742 (which are often COTS processors) and physical NIs 746, as well as non-transitory machine readable storage media 748 having stored therein software 750. During operation, the processor(s) 742 execute the software 750 to instantiate one or more sets of one or more applications 764A-R. While one embodiment does not implement virtualization, alternative embodiments may use different forms of virtualization. For example, in one such alternative embodiment the virtualization layer 754 represents the kernel of an operating system (or a shim executing on a base operating system) that allows for the creation of multiple instances 762A-R called software containers that may each be used to execute one (or more) of the sets of applications 764A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 754 represents a hypervisor (sometimes referred to as a virtual machine monitor (VMM)) or a hypervisor executing on top of a host operating system, and each of the sets of applications 764A-R is run on top of a guest operating system within an instance 762A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 740, directly on a hypervisor (in which case the unikernel is sometimes described as running within a LibOS virtual machine), or in a software container, embodiments can be implemented fully with unikernels running directly on a hypervisor represented by virtualization layer 754, unikernels running within software containers represented by instances 762A-R, or as a combination of unikernels and the above-described techniques (e.g., unikernels and virtual machines both run directly on a hypervisor, unikernels and sets of applications that are run in different software containers).

The instantiation of the one or more sets of one or more applications 764A-R, as well as virtualization if implemented, are collectively referred to as software instance(s) 752. Each set of applications 764A-R, corresponding virtualization construct (e.g., instance 762A-R) if implemented, and that part of the hardware 740 that executes them (be it hardware dedicated to that execution and/or time slices of hardware temporally shared), forms a separate virtual network element(s) 760A-R.

The virtual network element(s) 760A-R perform similar functionality to the virtual network element(s) 730A-R—e.g., similar to the control communication and configuration module(s) 732A and forwarding table(s) 734A (this virtualization of the hardware 740 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 762A-R corresponding to one VNE 760A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 762A-R to VNEs also apply to embodiments where such a finer level of granularity and/or unikernels are used.

In certain embodiments, the virtualization layer 754 includes a virtual switch that provides similar forwarding services as a physical Ethernet switch. Specifically, this virtual switch forwards traffic between instances 762A-R and the physical NI(s) 746, as well as optionally between the instances 762A-R; in addition, this virtual switch may enforce network isolation between the VNEs 760A-R that by policy are not permitted to communicate with each other (e.g., by honoring virtual local area networks (VLANs)).

Software 750 can include code such as packet tracing component 763, which when executed by processor(s) 742, cause the general purpose network device 704 to perform operations of one or more embodiments descried herein above as part software instances 762A-R.

The third exemplary ND implementation in FIG. 7A is a hybrid network device 706, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 702) could provide for para-virtualization to the networking hardware present in the hybrid network device 706.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 730A-R, VNEs 760A-R, and those in the hybrid network device 706) receives data on the physical NIs (e.g., 716, 746) and forwards that data out the appropriate ones of the physical NIs (e.g., 716, 746). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 7C:
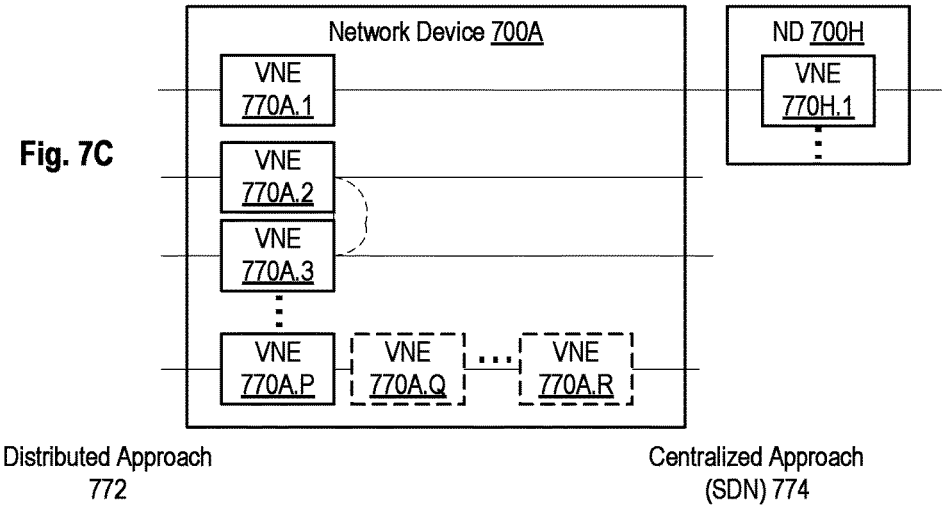
FIG. 7C illustrates various exemplary ways in which virtual network elements (VNEs) may be coupled according to some embodiments.

FIG. 7C illustrates various exemplary ways in which VNEs may be coupled according to some embodiments of the invention. FIG. 7C shows VNEs 770A.1-770A.P (and optionally VNEs 770A.Q-770A.R) implemented in ND 700A and VNE 770H.1 in ND 700H. In FIG. 7C, VNEs 770A.1-P are separate from each other in the sense that they can receive packets from outside ND 700A and forward packets outside of ND 700A; VNE 770A.1 is coupled with VNE 770H.1, and thus they communicate packets between their respective NDs; VNE 770A.2-770A.3 may optionally forward packets between themselves without forwarding them outside of the ND 700A; and VNE 770A.P may optionally be the first in a chain of VNEs that includes VNE 770A.Q followed by VNE 770A.R (this is sometimes referred to as dynamic service chaining, where each of the VNEs in the series of VNEs provides a different service—e.g., one or more layer 4-7 network services). While FIG. 7C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 7A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 7A may also host one or more such servers (e.g., in the case of the general purpose network device 704, one or more of the software instances 762A-R may operate as servers; the same would be true for the hybrid network device 706; in the case of the special-purpose network device 702, one or more such servers could also be run on a virtualization layer executed by the processor(s) 712); in which case the servers are said to be co-located with the VNEs of that ND.

A virtual network is a logical abstraction of a physical network (such as that in FIG. 7A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 7D:
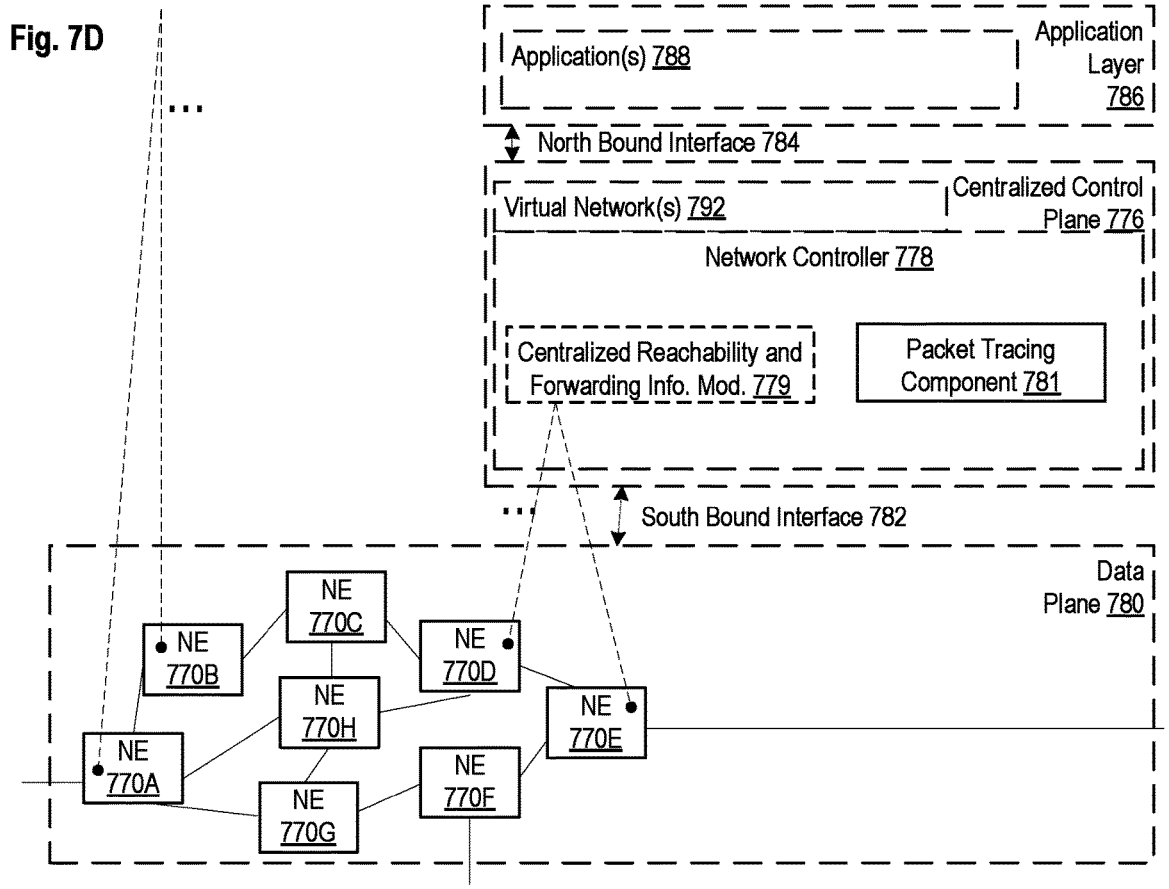
FIG. 7D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments.

FIG. 7D illustrates a network with a single network element on each of the NDs of FIG. 7A, and within this straight forward approach contrasts a traditional distributed approach (commonly used by traditional routers) with a centralized approach for maintaining reachability and forwarding information (also called network control), according to some embodiments of the invention. Specifically, FIG. 7D illustrates network elements (NEs) 770A-H with the same connectivity as the NDs 700A-H of FIG. 7A.

FIG. 7D illustrates that the distributed approach 772 distributes responsibility for generating the reachability and forwarding information across the NEs 770A-H; in other words, the process of neighbor discovery and topology discovery is distributed.

For example, where the special-purpose network device 702 is used, the control communication and configuration module(s) 732A-R of the ND control plane 724 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 770A-H (e.g., the processor(s) 712 executing the control communication and configuration module(s) 732A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 724. The ND control plane 724 programs the ND forwarding plane 726 with information (e.g., adjacency and route information) based on the routing structure(s). For example, the ND control plane 724 programs the adjacency and route information into one or more forwarding table(s) 734A-R (e.g., Forwarding Information Base (FIB), Label Forwarding Information Base (LFIB), and one or more adjacency structures) on the ND forwarding plane 726. For layer 2 forwarding, the ND can store one or more bridging tables that are used to forward data based on the layer 2 information in that data. While the above example uses the special-purpose network device 702, the same distributed approach 772 can be implemented on the general purpose network device 704 and the hybrid network device 706.

FIG. 7D illustrates that a centralized approach 774 (also known as software defined networking (SDN)) that decouples the system that makes decisions about where traffic is sent from the underlying systems that forwards traffic to the selected destination. The illustrated centralized approach 774 has the responsibility for the generation of reachability and forwarding information in a centralized control plane 776 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 776 has a south bound interface 782 with a data plane 780 (sometime referred to the infrastructure layer, network forwarding plane, or forwarding plane (which should not be confused with a ND forwarding plane)) that includes the NEs 770A-H (sometimes referred to as switches, forwarding elements, data plane elements, or nodes). The centralized control plane 776 includes a network controller 778, which includes a centralized reachability and forwarding information module 779 that determines the reachability within the network and distributes the forwarding information to the NEs 770A-H of the data plane 780 over the south bound interface 782 (which may use the OpenFlow protocol). Thus, the network intelligence is centralized in the centralized control plane 776 executing on electronic devices that are typically separate from the NDs. In one embodiment, the network controller 778 may include a packet tracing component 781 that when executed by the network controller 778, causes the network controller 778 to perform operations of one or more embodiments described herein above.

For example, where the special-purpose network device 702 is used in the data plane 780, each of the control communication and configuration module(s) 732A-R of the ND control plane 724 typically include a control agent that provides the VNE side of the south bound interface 782. In this case, the ND control plane 724 (the processor(s) 712 executing the control communication and configuration module(s) 732A-R) performs its responsibility for participating in controlling how data (e.g., packets) is to be routed (e.g., the next hop for the data and the outgoing physical NI for that data) through the control agent communicating with the centralized control plane 776 to receive the forwarding information (and in some cases, the reachability information) from the centralized reachability and forwarding information module 779 (it should be understood that in some embodiments of the invention, the control communication and configuration module(s) 732A-R, in addition to communicating with the centralized control plane 776, may also play some role in determining reachability and/or calculating forwarding information—albeit less so than in the case of a distributed approach; such embodiments are generally considered to fall under the centralized approach 774, but may also be considered a hybrid approach).

While the above example uses the special-purpose network device 702, the same centralized approach 774 can be implemented with the general purpose network device 704 (e.g., each of the VNE 760A-R performs its responsibility for controlling how data (e.g., packets) is to be routed (e.g., the next hop for the data and the outgoing physical NI for that data) by communicating with the centralized control plane 776 to receive the forwarding information (and in some cases, the reachability information) from the centralized reachability and forwarding information module 779; it should be understood that in some embodiments of the invention, the VNEs 760A-R, in addition to communicating with the centralized control plane 776, may also play some role in determining reachability and/or calculating forwarding information—albeit less so than in the case of a distributed approach) and the hybrid network device 706. In fact, the use of SDN techniques can enhance the NFV techniques typically used in the general purpose network device 704 or hybrid network device 706 implementations as NFV is able to support SDN by providing an infrastructure upon which the SDN software can be run, and NFV and SDN both aim to make use of commodity server hardware and physical switches.

FIG. 7D also shows that the centralized control plane 776 has a north bound interface 784 to an application layer 786, in which resides application(s) 788. The centralized control plane 776 has the ability to form virtual networks 792 (sometimes referred to as a logical forwarding plane, network services, or overlay networks (with the NEs 770A-H of the data plane 780 being the underlay network)) for the application(s) 788. Thus, the centralized control plane 776 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 7D shows the distributed approach 772 separate from the centralized approach 774, the effort of network control may be distributed differently or the two combined in certain embodiments of the invention. For example: 1) embodiments may generally use the centralized approach (SDN) 774, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 774, but may also be considered a hybrid approach.

While FIG. 7D illustrates the simple case where each of the NDs 700A-H implements a single NE 770A-H, it should be understood that the network control approaches described with reference to FIG. 7D also work for networks where one or more of the NDs 700A-H implement multiple VNEs (e.g., VNEs 730A-R, VNEs 760A-R, those in the hybrid network device 706). Alternatively or in addition, the network controller 778 may also emulate the implementation of multiple VNEs in a single ND. Specifically, instead of (or in addition to) implementing multiple VNEs in a single ND, the network controller 778 may present the implementation of a VNE/NE in a single ND as multiple VNEs in the virtual networks 792 (all in the same one of the virtual network(s) 792, each in different ones of the virtual network(s) 792, or some combination). For example, the network controller 778 may cause an ND to implement a single VNE (a NE) in the underlay network, and then logically divide up the resources of that NE within the centralized control plane 776 to present different VNEs in the virtual network(s) 792 (where these different VNEs in the overlay networks are sharing the resources of the single VNE/NE implementation on the ND in the underlay network).

Figure 7E:
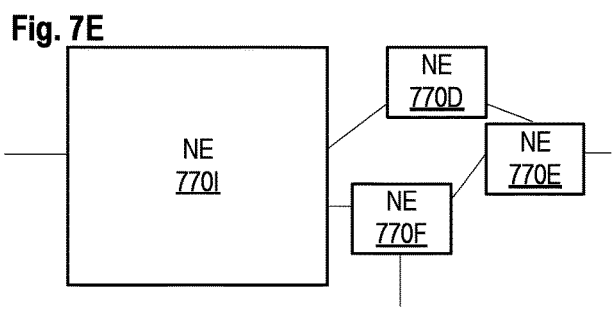
FIG. 7E illustrates the simple case of where each of the NDs implements a single NE, but a centralized control plane has abstracted multiple of the NEs in different NDs into (to represent) a single NE in one of the virtual network(s), according to some embodiments.
Figure 7F:
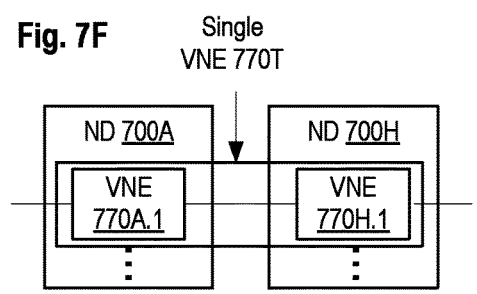
FIG. 7F illustrates a case where multiple VNEs are implemented on different NDs and are coupled to each other, and where a centralized control plane has abstracted these multiple VNEs such that they appear as a single VNE within one of the virtual networks, according to some embodiments.

On the other hand, FIGS. 7E and 7F respectively illustrate exemplary abstractions of NEs and VNEs that the network controller 778 may present as part of different ones of the virtual networks 792. FIG. 7E illustrates the simple case of where each of the NDs 700A-H implements a single NE 770A-H (see FIG. 7D), but the centralized control plane 776 has abstracted multiple of the NEs in different NDs (the NEs 770A-C and G-H) into (to represent) a single NE 770I in one of the virtual network(s) 792 of FIG. 7D, according to some embodiments of the invention. FIG. 7E shows that in this virtual network, the NE 770I is coupled to NE 770D and 770F, which are both still coupled to NE 770E.

FIG. 7F illustrates a case where multiple VNEs (VNE 770A.1 and VNE 770H.1) are implemented on different NDs (ND 700A and ND 700H) and are coupled to each other, and where the centralized control plane 776 has abstracted these multiple VNEs such that they appear as a single VNE 770T within one of the virtual networks 792 of FIG. 7D, according to some embodiments of the invention. Thus, the abstraction of a NE or VNE can span multiple NDs.

While some embodiments of the invention implement the centralized control plane 776 as a single entity (e.g., a single instance of software running on a single electronic device), alternative embodiments may spread the functionality across multiple entities for redundancy and/or scalability purposes (e.g., multiple instances of software running on different electronic devices).

Figure 8:
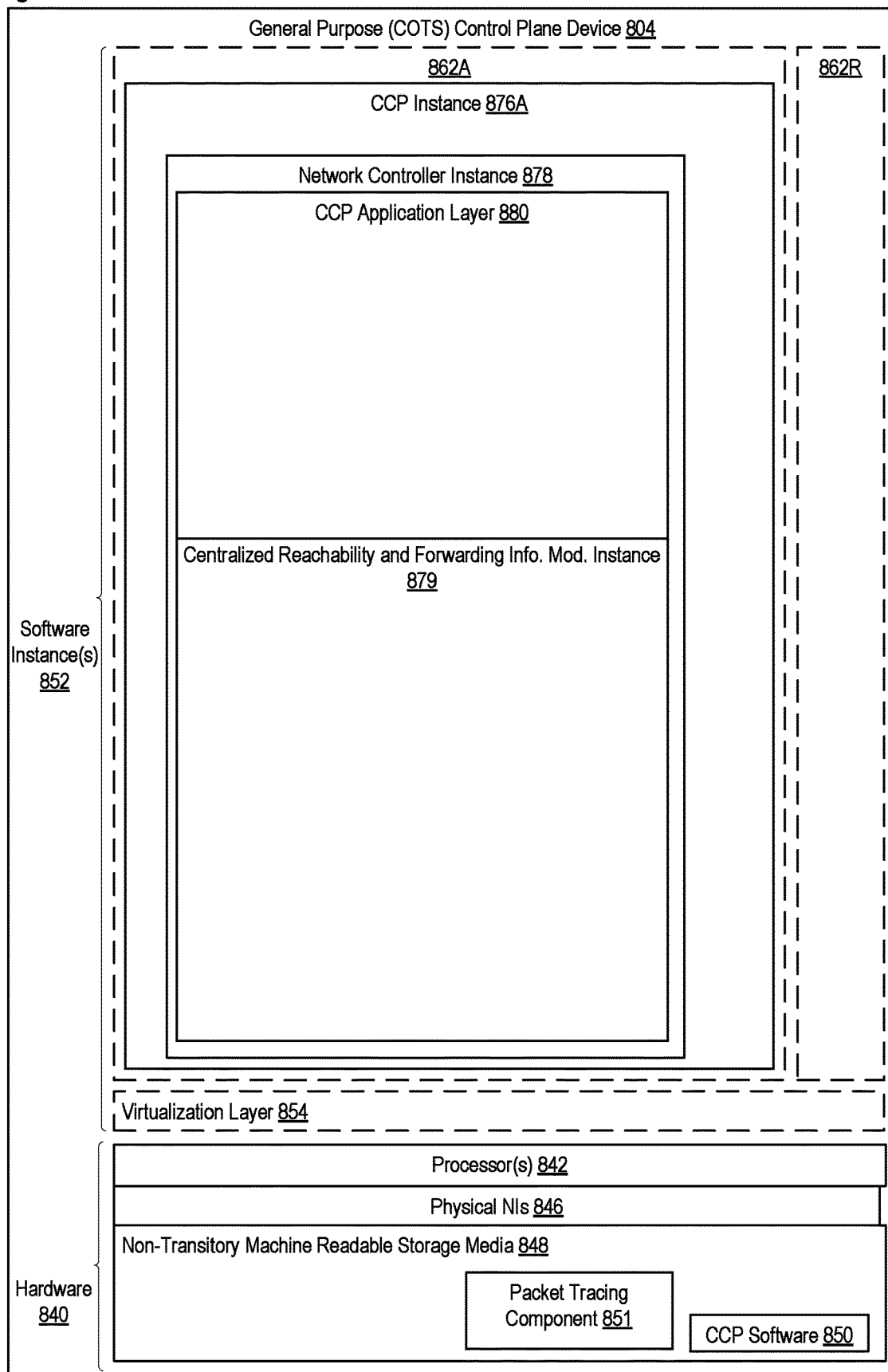
FIG. 8 illustrates a general purpose control plane device with centralized control plane (CCP) software 850), according to some embodiments.

Similar to the network device implementations, the electronic device(s) running the centralized control plane 776, and thus the network controller 778 including the centralized reachability and forwarding information module 779, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 8 illustrates, a general purpose control plane device 804 including hardware 840 comprising a set of one or more processor(s) 842 (which are often COTS processors) and physical NIs 846, as well as non-transitory machine readable storage media 848 having stored therein centralized control plane (CCP) software 850 and a packet tracing component 851.

In embodiments that use compute virtualization, the processor(s) 842 typically execute software to instantiate a virtualization layer 854 (e.g., in one embodiment the virtualization layer 854 represents the kernel of an operating system (or a shim executing on a base operating system) that allows for the creation of multiple instances 862A-R called software containers (representing separate user spaces and also called virtualization engines, virtual private servers, or jails) that may each be used to execute a set of one or more applications; in another embodiment the virtualization layer 854 represents a hypervisor (sometimes referred to as a virtual machine monitor (VMM)) or a hypervisor executing on top of a host operating system, and an application is run on top of a guest operating system within an instance 862A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 840, directly on a hypervisor represented by virtualization layer 854 (in which case the unikernel is sometimes described as running within a LibOS virtual machine), or in a software container represented by one of instances 862A-R). Again, in embodiments where compute virtualization is used, during operation an instance of the CCP software 850 (illustrated as CCP instance 876A) is executed (e.g., within the instance 862A) on the virtualization layer 854. In embodiments where compute virtualization is not used, the CCP instance 876A is executed, as a unikernel or on top of a host operating system, on the "bare metal" general purpose control plane device 804. The instantiation of the CCP instance 876A, as well as the virtualization layer 854 and instances 862A-R if implemented, are collectively referred to as software instance(s) 852.

In some embodiments, the CCP instance 876A includes a network controller instance 878. The network controller instance 878 includes a centralized reachability and forwarding information module instance 879 (which is a middleware layer providing the context of the network controller 778 to the operating system and communicating with the various NEs), and an CCP application layer 880 (sometimes referred to as an application layer) over the middleware layer (providing the intelligence required for various network operations such as protocols, network situational awareness, and user-interfaces). At a more abstract level, this CCP application layer 880 within the centralized control plane 776 works with virtual network view(s) (logical view(s) of the network) and the middleware layer provides the conversion from the virtual networks to the physical view.

The packet tracing component 851 can be executed by hardware 840 to perform operations of one or more embodiments described herein above as part of software instances 852.

The centralized control plane 776 transmits relevant messages to the data plane 780 based on CCP application layer 880 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 780 may receive different messages, and thus different forwarding information. The data plane 780 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 780, the packet (or a subset of the packet header and content) is typically forwarded to the centralized control plane 776. The centralized control plane 776 will then program forwarding table entries into the data plane 780 to accommodate packets belonging to the flow of the unknown packet. Once a specific forwarding table entry has been programmed into the data plane 780 by the centralized control plane 776, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

An embodiment of the invention may be an article of manufacture in which a non-transitory machine-readable medium (such as microelectronic memory) has stored thereon instructions (e.g., computer code) which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a switch in a Software Defined Networking (SDN) network to trace packets in the SDN network, where the switch includes a packet processing pipeline that includes a plurality of flow tables, the method comprising:
    receiving a first packet;
    determining, at a first flow table of the packet processing pipeline, whether the first packet is to be traced;
    sending a copy of the first packet to an SDN controller and directing the first packet to a second flow table of the packet processing pipeline in response to a determination at the first flow table that the first packet is to be traced;
    receiving, from the SDN controller, the copy of the first packet and an indication that the copy of the first packet is to be directed to a third flow table of the packet processing pipeline;

determining, at the first flow table, whether the copy of the first packet is to be traced;

setting a first field associated with the copy of the first packet to indicate that tracing is disabled for the copy of the first packet in response to a determination at the first flow table that the copy of the first packet is to be traced;

directing the copy of the first packet from the first flow table to the third flow table to resume processing of the copy of the first packet at the third flow table, wherein when the copy of the first packet arrives at the third flow table, the first field associated with the copy of the first packet is set to indicate that tracing is disabled for the copy of the first packet and a second field associated with the copy of the first packet is set to indicate that tracing is enabled for the copy of the first packet; and copying, at the third flow table, content of the second field associated with the copy of the first packet to the first field associated with the copy of the first packet before directing the copy of the first packet to a fourth flow table of the packet processing pipeline, wherein the copying causes the first field associated with the copy of the first packet to indicate that tracing is enabled for the copy of the first packet to allow the copy of the first packet to be traced at the fourth flow table.

2. The method of claim 1, wherein the determination at the first flow table that the copy of the first packet is to be traced is based on content of the first field associated with the copy of the first packet.

3. The method of claim 1, wherein the indication that the copy of the first packet is to be directed to the third flow table is included in an outermost Virtual Local Area Network (VLAN) header added to the copy of the first packet.

4. The method of claim 3, further comprising:

popping the outermost VLAN header from the copy of the first packet in response to the determination at the first flow table that the copy of the first packet is to be traced.

5. The method of claim 1, wherein the first packet directed to the second flow table is processed through the packet processing pipeline without being traced.

6. The method of claim 1, wherein the second field associated with the copy of the first packet is set when the copy of the first packet is received from the SDN controller.

7. The method of claim 1, wherein the second field associated with the copy of the first packet is set by the switch.

8. The method of claim 1, wherein the packet processing pipeline is an OpenFlow packet processing pipeline, wherein the first field is a bit in a metadata field associated with the copy of the first packet.

9. The method of claim 1, wherein the packet processing pipeline is an OpenFlow packet processing pipeline, and wherein the second field is a bit in a packet register field associated with the copy of the first packet.

10. The method of claim 1, wherein the copy of the first packet is received from the SDN controller as part of an OpenFlow Packet-Out message from the SDN controller.

11. A network device to function as a switch in a Software Defined Networking (SDN) network to trace packets in the SDN network, where the switch is to include a packet processing pipeline that includes a plurality of flow tables, the network device comprising:

a set of one or more processors; and a non-transitory machine-readable storage medium having stored therein a packet tracing component, which when executed by the set of one or more processors, causes the network device to receive a first packet, determine, at a first flow table of the packet processing pipeline, whether the first packet is to be traced, send a copy of the first packet to an SDN controller and direct the first packet to a second flow table of the packet processing pipeline in response to a determination at the first flow table that the first packet is to be traced, receive, from the SDN controller, the copy of the first packet and an indication that the copy of the first packet is to be directed to a third flow table of the packet processing pipeline, determine, at the first flow table, whether the copy of the first packet is to be traced, set a first field associated with the copy of the first packet to indicate that tracing is disabled for the copy of the first packet in response to a determination at the first flow table that the copy of the first packet is to be traced, direct the copy of the first packet from the first flow table to the third flow table to resume processing of the copy of the first packet at the third flow table, wherein when the copy of the first packet arrives at the third flow table, the first field associated with the copy of the first packet is set to indicate that tracing is disabled for the copy of the first packet and a second field associated with the copy of the first packet is set to indicate that tracing is enabled for the copy of the first packet, and copy, at the third flow table, content of the second field associated with the copy of the first packet to the first field associated with the copy of the first packet before directing the copy of the first packet to a fourth flow table of the packet processing pipeline, wherein the copying causes the first field associated with the copy of the first packet to indicate that tracing is enabled for the copy of the first packet to allow the copy of the first packet to be traced at the fourth flow table.

12. The network device of claim 11, wherein the determination at the first flow table that the copy of the first packet is to be traced is based on content of the first field associated with the copy of the first packet.

13. The network device of claim 11, wherein the indication that the copy of the first packet is to be directed to the third flow table is included in an outermost Virtual Local Area Network (VLAN) header added to the copy of the first packet.

14. The network device of claim 13, wherein the packet tracing component, when executed by the set of one or more processors, further causes the network device to pop the outermost VLAN header from the copy of the first packet in response to the determination at the first flow table that the copy of the first packet is to be traced.

15. A non-transitory machine-readable medium having computer code stored therein, which when executed by a set of one or more processors of a network device functioning as a switch in a Software Defined Networking (SDN) network, causes the network device to perform operations for tracing packets in the SDN network, where the switch includes a packet processing pipeline that includes a plurality of flow tables, the operations comprising:

receiving a first packet;

determining, at a first flow table of the packet processing pipeline, whether the first packet is to be traced;

sending a copy of the first packet to an SDN controller and directing the first packet to a second flow table of the packet processing pipeline in response to a determination at the first flow table that the first packet is to be traced;

receiving, from the SDN controller, the copy of the first packet and an indication that the copy of the first packet is to be directed to a third flow table of the packet processing pipeline;

determining, at the first flow table, whether the copy of the first packet is to be traced;

setting a first field associated with the copy of the first packet to indicate that tracing is disabled for the copy of the first packet in response to a determination at the first flow table that the copy of the first packet is to be traced;

directing the copy of the first packet from the first flow table to the third flow table to resume processing of the copy of the first packet at the third flow table, wherein when the copy of the first packet arrives at the third flow table, the first field associated with the copy of the first packet is set to indicate that tracing is disabled for the copy of the first packet and a second field associated with the copy of the first packet is set to indicate that tracing is enabled for the copy of the first packet; and copying, at the third flow table, content of the second field associated with the copy of the first packet to the first field associated with the copy of the first packet before directing the copy of the first packet to a fourth flow table of the packet processing pipeline, wherein the copying causes the first field associated with the copy of the first packet to indicate that tracing is enabled for the copy of the first packet to allow the copy of the first packet to be traced at the fourth flow table.

16. The non-transitory machine-readable medium of claim 15, wherein the determination at the first flow table that the copy of the first packet is to be traced is based on content of the first field associated with the copy of the first packet.

17. The non-transitory machine-readable medium of claim 15, wherein the first packet directed to the second flow table is processed through the packet processing pipeline without being traced.

18. The non-transitory machine-readable medium of claim 15, wherein the packet processing pipeline is an OpenFlow packet processing pipeline, wherein the first field is a bit in a metadata field associated with the copy of the first packet, and wherein the second field is a bit in a packet register field associated with the copy of the first packet.

* * * * *